(12) United States Patent
Nagai et al.

(10) Patent No.: US 6,688,737 B2
(45) Date of Patent: Feb. 10, 2004

(54) RECORDING LIQUID, INKJET RECORDING METHOD AND RECORDING EQUIPMENT USING THE SAME

(75) Inventors: Kiyofumi Nagai, Tokyo (JP); Hitoshi Arita, Kangawa (JP); Nobutaka Osada, Misima (JP); Masayuki Koyano, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/007,374

(22) Filed: Dec. 5, 2001

(65) Prior Publication Data

US 2002/0135650 A1 Sep. 26, 2002

(30) Foreign Application Priority Data

Dec. 5, 2000 (JP) .................... P2000-370598

(51) Int. Cl.[7] ................................. B41J 2/01
(52) U.S. Cl. .................. 347/100; 347/95; 347/96
(58) Field of Search ............ 347/100, 96, 101, 347/103, 95, 84, 1, 98; 106/31.27, 31.13; 523/160

(56) References Cited

U.S. PATENT DOCUMENTS

| | | | |
|---|---|---|---|
| 4,647,310 A | 3/1987 | Shimada et al. | 106/22 |
| 4,711,668 A | 12/1987 | Shimada et al. | 106/22 |
| 4,793,860 A | 12/1988 | Murakami et al. | 106/22 |
| 5,431,720 A | 7/1995 | Nagai et al. | 106/20 R |
| 5,514,208 A | 5/1996 | Nagai et al. | 106/22 H |
| 5,618,726 A * | 4/1997 | Paszczynski et al. | 435/262.5 |
| 5,622,550 A | 4/1997 | Konishi et al. | 106/22 K |
| 5,810,915 A | 9/1998 | Nagai et al. | 106/31.43 |
| 5,879,439 A | 3/1999 | Nagai et al. | 106/31.28 |
| 5,882,390 A * | 3/1999 | Nagai et al. | 106/31.49 |
| 5,972,082 A | 10/1999 | Koyano et al. | 106/31.27 |
| 5,993,524 A * | 11/1999 | Nagai et al. | 106/31.27 |
| 6,099,628 A | 8/2000 | Nohr et al. | |
| 6,120,589 A | 9/2000 | Bannai et al. | 106/31.27 |
| 6,231,652 B1 | 5/2001 | Koyano et al. | 106/31.27 |
| 6,251,553 B1 | 6/2001 | Baur et al. | |
| 6,261,349 B1 * | 7/2001 | Nagai et al. | 347/100 |

FOREIGN PATENT DOCUMENTS

| | | | |
|---|---|---|---|
| EP | 1 004 941 A1 | 5/2000 | |
| JP | 06271800 A * | 9/1994 | ........... B41J/02/01 |
| JP | 07109429 A * | 4/1995 | ........... C09D/11/00 |

OTHER PUBLICATIONS

U.S. patent application Ser. No. 9,662,886, Arita et al., filed Sep. 2000.
U.S. patent application Ser. No. 9,894,778, Gotoh et al., filed Jun. 2001.

* cited by examiner

Primary Examiner—Stephen D. Meier
Assistant Examiner—Manish Shah
(74) Attorney, Agent, or Firm—Cooper & Dunham LLP

(57) ABSTRACT

A recording liquid including a coloring material, an organic solvent to disperse or to dissolve said coloring material, water, and a calix[n]arene-p-4-sulfonic acid (where n=4–8) in the form of free acid or its metal salt. The recording liquid is very suitable for inkjet recording using plain paper as recording medium. The recording liquid shows high storage stability, excellent color reproducibility with hard blurring property of mutual colors at superposed area thereof, and high resistively for light fading, for the sake of buffering nature based by both ion-capturing and -releasing, and hydrophobic material-capturing and -releasing bestowed by above-mentioned calix compound.

23 Claims, 6 Drawing Sheets

RECORDING LIQUID, INKJET RECORDING METHOD AND RECORDING EQUIPMENT USING THE SAME

BACKGROUND OF THE INVENTION

1. Field of the Invention

The present invention relates to an aqueous recording liquid suitable for inkjet recording, particularly, to a composition of a recording liquid featuring excellent characteristics in the case of using so-called plain paper, and also to a recording method and a composition suitable for the recording liquid. The present invention may be applied as aqueous ink compositions for aqueous writing instruments, recording instruments, and pen plotters.

2. Description of the Related Art

Various researches with inkjet printers have in recent years, been envisaged in order to improve printing properties and fastness of printing on plain paper being used. Particularly, color images on plain paper have been improved with a view for decreasing the blurring of printed letters and inter-colors bleeding.

Furthermore, researches have extensively been conducted in order to improve problems of waterproofing and of light fading or degrading. Particularly, while inkjet printers and plotters using ink employing pigments as coloring materials have been now available, they however still have more problems in reliability than those using dye ink, by occurrence of clogging or the like. In addition, while ink containing particles being colored by dyes or pigments has been investigated in order to prevent color bleeding, there still remains problem of clogging, caused by attaching of the ink to a nozzle portion.

An attempt for yielding higher quality of images has been carried out by use of dot density modulation art using inks more dense and lesser dense, in combination with area modulation art, in order to substitute silver emulsion photography by inkjet printing. As a result, high quality images being compatible to those given by silver emulsion photography are now reproducible on brightened paper. However, the resistibility for light fading is still insufficient, and the image quality on plain paper with regard to both density and chroma is poorer than those by electrophotography.

In order to improve the light resistibility, it has been attempted to add an ultraviolet absorbent or an antioxidant to inks. For example, Japanese Unexamined Patent Publication (Tokkai) No. 4-227773 discloses to add an ultraviolet absorbent having hydrophilic groups. However, the ultraviolet absorbent in aqueous ink is so readily crystallized that clogging is likely to occur.

Other attempts for adding dye-chelated compound into ink have been carried out to prevent fading. For example, suppression of fading has been designed by adding β-cyclodextrin into a light purple-magenta ink, but, it leads to a significant increase of viscosity. Therefore if an ink being concentrated enough is used, adding of the β-cyclodextrin into the ink of high density sufficient to make it possible chelating will be suffered from a difficulty to eject ink, due to an increased viscosity.

It also has been attempted to improve the reliability by forming chelated compounds of cyclodextrin with coloring material, in order to prepare insoluble and highly water-resistant colors. Japanese Patent No. 2612661 discloses an ink obtained by forming a chalated compound of cyclodextrin or polycyclodextrin including an alcohol-soluble or oil-soluble dye, and dissolving the chelated compound in the ink. However, for some types of dye, sufficient reliability in reproducing dense enough images cannot be attained.

Moreover, Japanese Unexamined Patent Publication (Tokkai) No. 11-506800 discloses an attempt to ensure the reliability and to improve light resistibility by bonding an ultraviolet absorbent with cyclodextrin. However, for some types of dye, sufficient effects also cannot be attained.

On the other hand, for the purpose of suppressing the bleeding in the boundary of colors, efforts to find out compounds to be used in ink have been made, according to which a compound is added to precipitate at least one coloring material in the ink. For example, Japanese Unexamined Patent Publication (Tokkai) No. 10-219160 discloses an ink set using color ink containing a water-soluble calcium salt or magnesium salt, together with a comparatively highly water-soluble dye as coloring material, thereby suppressing the bleeding on boundary of printings is made. The cited Publication also says that the bleeding may often be countered by use of black ink having a slow permeability. Japanese Unexamined Patent Publication (Tokkai) No. 11-323225 discloses an ink set using ink containing a quaternary ammonium salt and/or a water-soluble polyvalent metal salt, to suppress the bleeding on the boundary of printings. Which may be happened in case of self-dispersion of carbon ink having a slow permeability is used. However, the water resistibility of such color inks is not sufficient, because of there are only limited varieties in combination of dyes capable of adding salts therein are investigated.

For the purpose of improving the suitability of ink for plain paper various attempts to modify the ink using pigment, colored particles or the like as a coloring material from a view of improving reliability, have been researched to improve the reliability of ink using pigment. For example, Japanese Unexamined Patent Publication (Tokkai) No. 10-330665 discloses pigments ink using self-dispersible carbon particles and using urea or urea derivatives. The cited also discloses inks having resinous particles being colored by dyes or pigments, and showing improved reliability by adding urea or the like.

While those types of inks are preferable in recording with recording head having a high ejection pressure and utilizing thermal energy, its ejection characteristics in the case of actuator driven by piezoelectricity or electrostatic force may however be affected by ammonia or carbon dioxide generated by decomposing of the urea. In the case of using thermal energy too, the reliability may often be deteriorated in the head being contacted with ink, depending on head material.

In addition to the influence of carbon dioxide from atmosphere, acidic substance being eluted into ink, which makes lowered the pH of ink, may occur especially during high temperature storage, to make deteriorating of components being contacted with the ink. This phenomenon is particularly noticeable in the case of inks having some types of dyes or self-dispersing carbon particles.

SUMMARY OF THE INVENTION

It is the first object of the present invention to provide a recording liquid and an ink for inkjet recording which satisfy various characteristics and show an excellent coloring property on plain paper, with high durability of image in storage such as light fastness and the like, and improved reliability.

It is the second object of the present invention to provide more preferable scheme of compound salts to be added the recording liquid for the purpose of improving the above-mentioned properties.

It is the third object of the present invention to provide more preferable and defined mode of above-mentioned compound salts.

It is the fourth and the fifth objects of the present invention to provide more preferable and defined mode achievable excellent safety of the compound salts.

It is the sixth object of the present invention to provide a recording liquid and an ink for inkjet recording which make them capable of suppressing the bleeding on the boundary of colors, and capable of improving light stability and the water resistibility.

It is the seventh object of the present invention to provide an additive preferably used without affecting color tone of images.

It is the eighth object of the present invention to provide a recording liquid and an ink for inkjet recording which show preferable color reproducibility on plain paper, with improved light stability.

It is the ninth object of the present invention to provide a recording liquid and an ink for inkjet recording which show an improved light stability, a balanced color tone with a water resistibility on plain paper.

It is the tenth object of the present invention to provide a recording liquid and a pigment ink for inkjet recording which has a high water resistibility and light resistibility, and a high reliability with more improved anti-bleeding property on the boundary of colors, compared to those by prior arts.

It is the eleventh object of the present invention to provide a recording liquid and a pigment ink for inkjet recording which have an excellent reliability in printing system.

It is the twelfth object of the present invention to provide a recording liquid and a pigment ink for inkjet recording which have a excellent fixability and a high reliability.

It is the thirteenth object of the present invention to provide a recording liquid and a pigment ink for inkjet recording which have a high ejection stability even after a long time pause.

It is the fourteenth object of the present invention to provide a recording liquid and a pigment ink for inkjet recording which have a high ejection stability, especially excellent water resistibility and bleeding resistibility on the boundary of colors.

It is the fifteenth object of the present invention to provide a recording liquid and an ink for inkjet recording, which are endowed an improved color reproducibility and an improved chromatic property on plain paper, and are obtainable images having high light stability.

It is the sixteenth object of the present invention to provide a recording liquid and an ink for inkjet recording using colored particles, thereby an excellent reliability in printing system and the minimized degree of image degradation are shown.

It is the seventeenth object of the present invention to disclose a water-soluble or mixable organic solvent to be added into the ink, in order to provide a moisture-retaining property to ink and to provide a suitable range of properties to hold ejection stability.

It is the eighteenth and the nineteenth objects of the present invention to disclose an embodiment having improved wettability to a recording medium.

It is the twentieth object of the present invention to disclose a range for favorable combinations of the ink or recording liquid and other materials used in printing system, from a view of system's durability and stability, with excellent compatibility of the recording liquid or the ink.

It is the twenty-first object of the present invention to disclose a recording method that can form good images with using of the ink.

It is the twenty-second object of the present invention to provide an ink cartridge that can form good images with using of the ink.

It is the twenty-third object of the present invention to provide an inkjet equipment that can form good images with using of the ink.

Above-mentioned objects are achieved in accordance to the present invention featuring characteristics as described hereinafter; which comprises;

(1): A recording liquid comprising a coloring material, an organic solvent to disperse or to dissolve the coloring material, and water, wherein the recording liquid further comprises a compound represented by the following formula (1) in the form of free acid or a salt thereof.

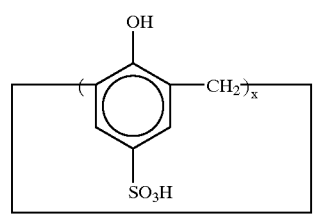

(1)

Where x is 4 to 8;

(2): The recording liquid according to above described (1), wherein the salt is one of selected from the group consisting of an alkali metal salt, a quaternary ammonium salt, an alkanolamine salt, and a quaternary phosphonium salt;

(3): The recording liquid according to above described (1) or (2), wherein the alkali metal salt is of lithium salt;

(4): The recording liquid according to any one of above described (1) to (3), wherein the quaternary ammonium salt has at least one hydroxyl group;

(5): The recording liquid according to any one of above-described (1) to (4), wherein the alkanolamine is one of selected from the group consisting of ethanol amine, diethanol amine, and triethanol amine;

(6): The recording liquid according to any one of above described (1) to (5), comprising a polyvalent metal ion source compound releasable polyvalent metal ion consisting, in the alkaline state, of a compound represented by above mentioned formula (1) and a phenolate complex;

(7): The recording liquid according to above described (6), wherein the polyvalent metal ion source compound is, at least one, of selected from the group consisting of an alkaline-earth metal salt, a lanthanoid metal salt, an aluminum salt and a zinc salt, and of vested with a solubility more than or equal to 1 g/100 g in water;

(8): The recording liquid according to any one of above described (1) to (7), wherein the coloring material is a dye;

(9): The recording liquid according to above described (8), wherein the dye has at least one sulfonic acid group and/or carboxylic acid group therein;

(10): The recording liquid according to any one of above described (1) to (7), wherein the coloring material is a pigment;

(11): The recording liquid according to above described (10), wherein the pigment is particles with average size 10 to 300 nm;

(12): The recording liquid according to above described (10) or (11), wherein the coloring material is a pigment and being dispersed in water by a dispersant, and said dispersant is bonded to one or more of carboxyl group.

(13): The recording liquid according to above described (10) or (11), wherein the coloring material is a pigment, and said pigment being improved in its surface by bonding of a hydrophilic group or groups, and said pigment being dispersed in water;

(14): The recording liquid according to above described (13), wherein one or more of hydrophilic group is bonded to the surface of the pigment is one or more of carboxyl group;

(15): The recording liquid according to any one of above described (1) to (7), wherein the coloring material is a particles being colored by a dye or a pigment;

(16): The recording liquid according to above described (15), wherein the colored particles have an average size 10 to 300 nm;

(17): The recording liquid according to any one of above described (1) to (16), comprising a water-soluble or water-mixable organic solvent of the recording liquid containing at least one water-soluble or water-mixable organic solvent selected from the group consisting of glycerin, ethylene glycol, diethylene glycol, triethylene glycol, propylene glycol, dipropylene glycol, tripropylene glycol, 1,3-butanediol, 2,3-butanediol, 1,4-butanediol, 1,5-pentanediol, tetraethylene glycol, 1,6-hexanediol, 2-methyl-2-, 4-pentanediol, polyethylene glycol, 1,2,4-butanetriol, 1,2,6-hexanetriol, thiodiglycol, 2-pyrrolidone, N-methyl-2-pyrrolidone, N-hydroxyethyl-2-pyrrolidone, and 1,3-dimethyl-2-imidazolidinone;

(18): The recording liquid according to any one of above described (1) to (17), wherein the recording liquid containing at least one surfactant selected from salt of poly-oxyethylene alkyl ether acetate, salt of dialkyl sulfosuccinate, poly-oxyethylene alkyl ether, poly-oxyethylene alkyl phenyl ether, polyoxyethylene-polyoxypropylene block copolymer and acetylenic glycol-based surfactants;

(19) The recording liquid according to any one of above described (1) to (18), wherein the recording liquid containing polyhydric alcohol alkyl ether and/or diol having or more of carbon atoms.

Above-mentioned objects are also achieved in accordance of the present invention featuring characteristics as described hereinafter; which also comprises;

(20) The recording liquid according to any one of above described (1) to (19), wherein the pH of the recording liquid is adjusted to 6 to 11.

Above-described objects can also be achieved in accordance to the present invention featuring characteristics as follow;

(21) A recording method by ejecting the recording liquid according to any one of above described (1) to (20), characterized by ejecting the ink as small droplets by action of thermal energy or mechanical energy, and attaching the droplets to a material to be printed having sized degree of 3 seconds or more by Stoeckigt Sizing Degree determination conducted by the test method of JIS P-8122, and by reproducing printings with the resolution degree not less than 10 dots/mm×10 dots/mm fineness, and with the amount of ink attached on the material to be recorded is 1.5 g/m² to 30 g/m².

Above described objects can also be achieved in accordance to the present invention featuring characteristics as follow;

(22): A recording liquid cartridge comprising a recording liquid reservoir containing a recording liquid, wherein the contained recording liquid is of the recording liquid according to any one of above described (1) to (20).

Above described objects can also be achieved in accordance to the present invention featuring characteristics as follow;

(23): An inkjet recording apparatus comprising a recording liquid reservoir or a recording liquid cartridge containing a recording liquid, or a recording liquid cartridge, and a head portion or a recording unit for ejecting the recording liquid in form of droplets by action of thermal energy or mechanical energy, wherein the recording liquid according to any one of above described (1) to (20) is used as the recording liquid.

Calix[n]arene-p-sulfonic acid represented by following formula (1) used in the present invention has phenollic hydroxyl groups and acts as an antioxidant. This calix compound itself is disclosed in Japanese Unexamined Patent Publication (Tokkai) No. 4-100890. Furthermore, the calix [n]arene-p-sulfonic acid can coordinate other compounds having hydrophobic group or groups inside of ring, the same as that other chalating sources can react with ligands to form chelating. It is also known that this kind of OH group forms a complex bonding with metal ions (J. of The Chemical Society of Japan, 583, N09, 1999). Moreover, this calix compound is characterized by a high solubility in water because it has sulfonic acid groups so that it is dissolved by 8 to 20% in water at 25° C., although it depends on the number of x.

In particular, it has become clear that the degree of dissociation of the sulfonic acid group and the phenollic OH group to transform to free form are changed, depending on the value of pH, thereby ability of making complex of the organic cation with metal ion is also changed, thus, the resulted complex can always work as an antioxidant having a function to prevent the fading or discoloring of pigment, and furthermore, a function to suppress the bleeding on the boundary of colors can be provided, too.

Hereinafter is given by an example of the compound represented by formula (1) of the present invention, and by modified examples in cases of high pH and low pH of them.

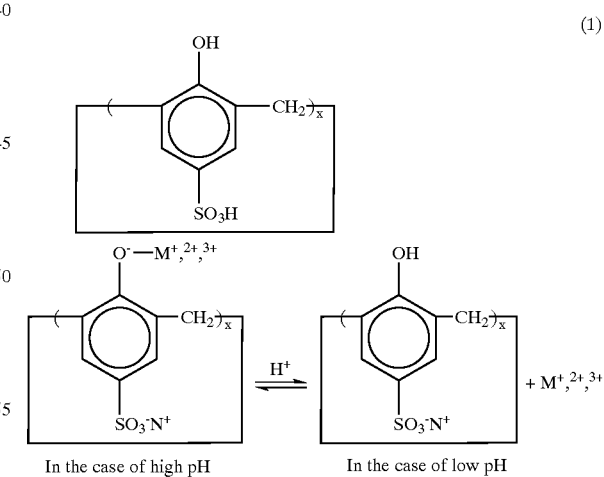

Where a metal ion or an organic cation is shown as a phenolate complex, M represents a coordinator, and $N^+$ represents a monovalent cation.

It has become evident that in the high pH state, it is possible to suppress the aggregation of coloring material positioned in the ink, and in the low pH state, the coloring material makes it to be more insoluble, or to be more reduced one in solubility for water, providing the water resistively.

Furthermore, it has become evident that the compound of formula (1) captures polyvalent metal ions caused by contamination during ink production or recording system operation, or includes the hydrophobic groups of the coloring material, in the case of high pH, thereby the storage properties can be improved.

It was found that while the coloring material having conventional formulation shows a significant pH reduction by high temperature storage or by the influence of carbon dioxide or the like, the compound of formula (1) of the present invention however improves storage durability and receptivity of the ink using the same conventional coloring material, by improving its pH buffering property, with making the inclusion of organic cations such as alkali metal ions, quaternary ammonium and phosphnium and the like, to form chelated compound.

It was also found that above mentioned function as an antioxidant results the effect of suppressing the deterioration of the members to be contacted with the ink in printing system, to prevent corrosion of them.

The ink of the present invention can be used satisfactorily in printers utilizing pressure by PZT force, printers with vibration plate bent ejecting ink by electrostatic force, drop-on-demand inkjet printers of bubble jet system utilizing boiled film, and any other printers with so-called charge control systems for charging ink electrically while vibrating the ink by PZT plate. In particular, the ink of the present invention is so highly reliable that it can be ejected with a stability by through a mall nozzle having a diameter of 20 $\mu$m or less.

Regarding the source of calix[n]arene-p-sulfonic acid represented by formula (1), namely, calix[4]arene, calix[5]arene, calix[6]arene, calix[7]arene, and calix[8]arene, they are able to be sulfonated with concentrated sulphuric acid at about 80° C. to yield corresponding sulfonic acid salts used in the present invention. They are, however as for as sodium salts are concernd, available from Acros Organics Corp., as CALX-S4, CALX-S6, and CALX-S8 from Sugai Chemical Industry Corp. Ltd.

Impurities can be removed from these compounds by subjecting the crude compounds to recrystallization with using mixture of water and methanol. Removal of inorganic salts such as sodium chloride can be conducted by treating aqueous solutions thereof, with a reverse osmosis membrane, ion-exchange resin, an ultrafiltration membrane or the like. In particular, in order to enhance the reliability, the compound of formula (1) is contained in the form of a lithium salt as an alkali salt, or in the form of a quaternary ammonium salt, a phosphonium salt or an alkanolamine salt in the recording liquid so that the stability of it can be improved.

Examples of the hydroxides of quaternary ammonium and phosphonium which can produce preferable salts when used in combination with the compound of formula (1) may include compounds of following formula (I), and specific examples thereof are, for example, those shown in Table 1.

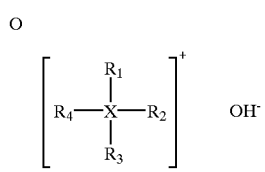

(I)

Where X represents nitrogen or phosphorus, $R^1$ to $R^4$ represent hydrogen, alkyl groups having 1 to 4 carbon atoms, hydroxyalkyl groups, or halogenated alkyl groups.

TABLE 1

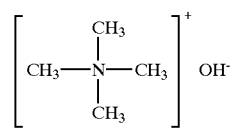   (I-1)

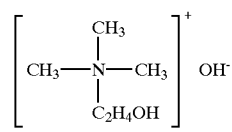   (I-2)

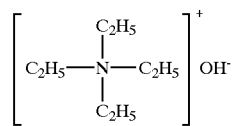   (I-3)

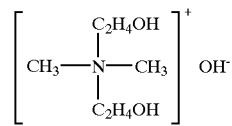   (I-4)

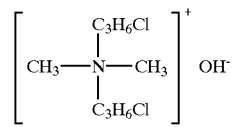   (I-5)

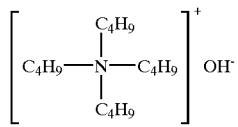   (I-6)

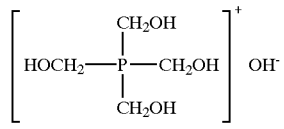   (I-7)

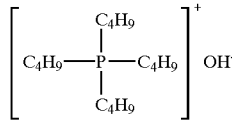   (I-8)

It is preferable to change the calix [n]arene compound into its salts of the hydroxides, especially, of (I-2), (I-4) and (I-7) having a hydroxyl group in Table 1. They provide the most excellent storage durability. It is preferable that the hydroxide is neutralized in an amount of at least 0.3 times moles thereof with the sulfonic acid group of the calix [n]arene compound. Alternatively, a part of the phenol hydroxyl group may be neutralized.

In the present invention, examples of the water-soluble salts to be added for the purpose of suppressing the bleeding in the boundary of inter colors, or of improving light fastness and waterproofing property of the dye are, for instance, quaternary ammonium salts or polyvalent metal salts. In particular, the salts of polyvalent metal ions used preferably are those capable of chelating with the compound represented by formula (1) to form a phenolate complex therewith. Examples of the ions are as for $Be^{2+}$, $Mg^{2+}$, $Ca^{2+}$, $Sr^{2+}$ and $Ba^{2+}$ of the alkaline-earth metals, $Al^{3+}$, $Ga^{3+}$, $In^{3+}$ and $Sn^{4+}$ of the Group ITTE of the Periodic Table, $Ti^{4+}$, $Fe^{3+}$, $Co^{2+}$ and $Cu^{2+}$ of the transition metals and $La^{3+}$, $Ce^{3+}$, $Pr^{3+}$, $Nd^{3+}$, $Sm^{3+}$, $Eu^{3+}$ and $Gd^{3+}$ of the lanthanoid metals.

In particular, highly water soluble alkaline earth metal salts, lanthanoid metal salts, zinc salts, they have a solubility in water of 1 g/100 g or more, are preferable because they easily form a phenolate complex or salt with the compound represented by formula (1) when being dissolved in water.

Specific examples thereof are as for magnesium nitrate (42.1 g), magnesium sulfate (26.7 g), magnesium chloride (35.5 g), lanthanum chloride (49.27 g), lanthanum nitrate (56.1 g), lanthanum sulfate (2.25 g), calcium chloride (45.3 g), calcium nitrate (57.98 g), and zinc nitrate (56.1 g).

The amount of these salts to be added can be suitably selected depending on the characteristics of the coloring material used in the ink set for forming color images, but it is added preferably in an amount of 0.1 to 10 wt. %. An amount of 0.1 wt. % or less provides little effect, and an amount of 10 wt. % or more is more likely to cause sedimentation due to temperature change, or poor ejection due to evaporation of water existing near by nozzle.

The amount of the coloring material in the ink of the present invention is ranging from 0.1 to 20 wt. %, and preferably 0.2 to 8 wt. %, depending on purposes of application. An amount of 0.1 wt. % or less does not provide coloring ability, even if it is used for light color ink, and an amount of 20 wt. % or more provides excessively high viscosity so that ejection is difficulty.

The water-soluble dye used in the present invention can be used in combination with other coloring materials, if necessary. As the water-soluble dye used in the present invention, dyes classified into acid dyes, direct dyes, basic dyes, reactive dyes, food dyes stated in The Color Index, that have excellent waterproofing property and light resistibility, can be used.

Specific examples of these dyes are as follows. Examples of acid dyes and food dyes are as for C.I. Acid Yellow 17, 23, 42, 44, 79 and 142, C.I. Acid Red 1, 8, 13, 14, 18, 26, 27, 35, 37, 42, 52, 82, 87, 89, 92, 97, 106, 111, 114, 115, 134, 186, 249, 254 and 289, C.I. Acid Blue 9, 29, 45, 92 and 249, C.I. Acid Black 1, 2, 7, 24, 26 and 94, C.I. Food Yellow 3 and 4, C.I. Food Red 7, 9 and 14 and C.I. Food Black 1 and 2. Examples of direct dyes are as for C.I. Direct Yellow 1, 12, 24, 26, 33, 44, 50, 86, 120, 132, 142 and 144, C.I. Direct Red 1, 4, 9, 13, 17, 20, 28, 31, 39, 80, 81, 83, 89, 225 and 227, C.I. Direct Orange 26, 29, 62 and 102, C.I. Direct Blue 1, 2, 6, 15, 22, 25, 71, 76, 79, 86, 87, 90, 98, 163, 165, 199 and 202 and C.I. Direct Black 19, 22, 32, 38, 51, 56, 71, 74, 75, 77, 154, 168 and 171. Examples of basic dyes are as for C.I. Basic Yellow 1, 2, 11, 13, 14, 15, 19, 21, 23, 24, 25, 28, 29, 32, 36, 40, 41, 45, 49, 51, 53, 63, 64, 65, 67, 70, 73, 77, 87 and 91, C.I. Basic Red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109 and 112, C.I. Basic Blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147 and 155 and C.I. Basic Black 2 and 8. Examples of reactive dyes are as for C.I. Reactive Black 3, 4, 7, 11, 12 and 17, C.I. Reactive Yellow 1, 5, 11, 13, 14, 20, 21, 22, 25, 40, 47, 51, 55, 65 and 67, C.I. Reactive Red 1, 14, 17, 25, 26, 32, 37, 44, 46, 55, 60, 66, 74, 79, 96, 97 and 180 and C.I. Reactive Blue 1, 2, 7, 14, 15, 23, 32, 35, 38, 41, 63, 80 and 95. Especially, acid dyes and direct dyes can be used preferably.

Furthermore, dyes of the Projet (product name) series such as Projet Cyan 2, Projet Magenta 2, and Projet Yellow 2 produced by Avecia that were developed as dyes for inkjets are also preferable.

The dyes to which sulfonic acid or carboxylic acid being introduced are particularly preferable in the present invention, because of their balance of waterproofing property with reliability. While specific examples are the dyes shown in Table 2, which are described in form of free acid, the present invention is however not limited thereto.

TABLE 2-1

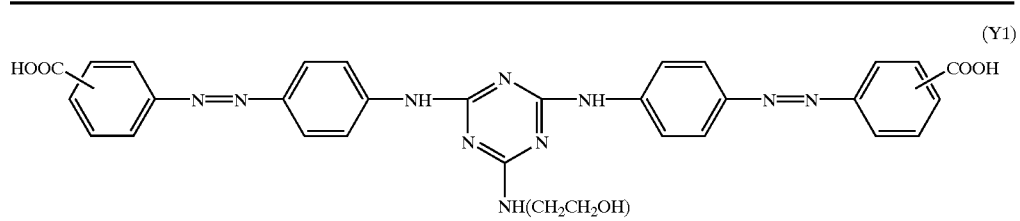

(Y1)

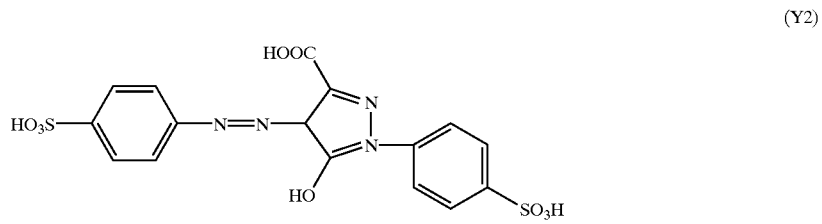

(Y2)

TABLE 2-1-continued
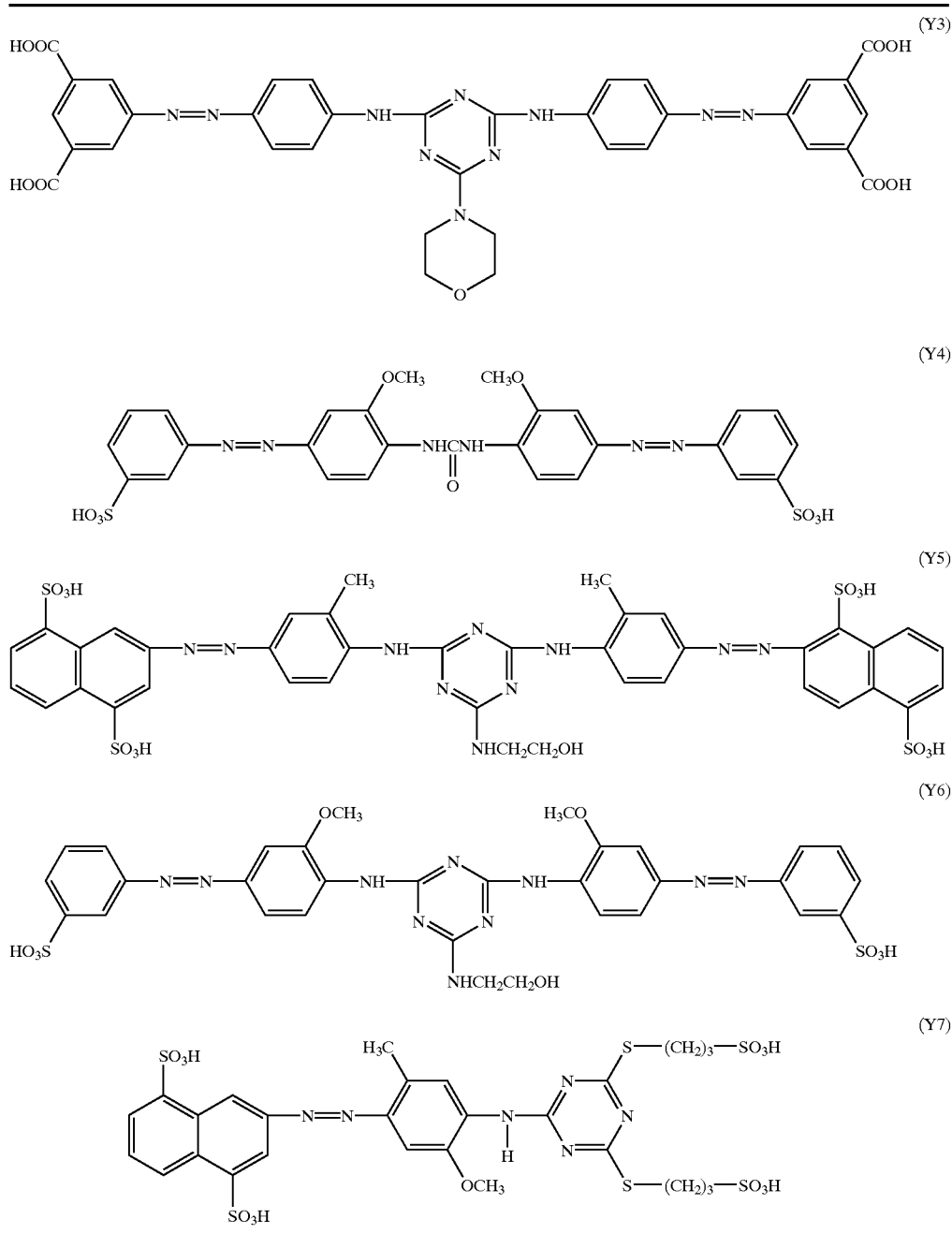
TABLE 2-2
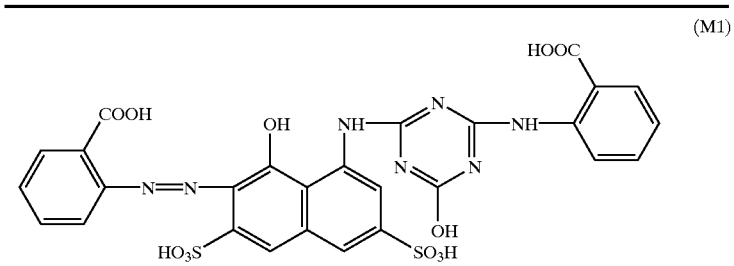

TABLE 2-2-continued
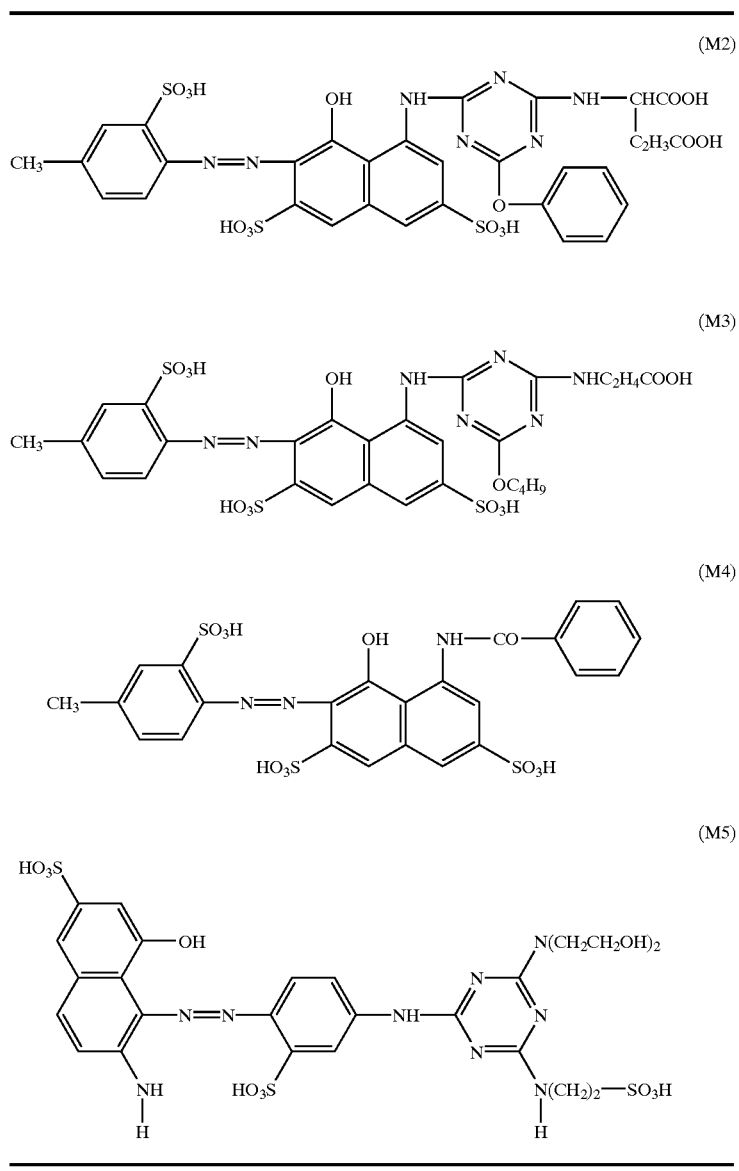
TABLE 2-3
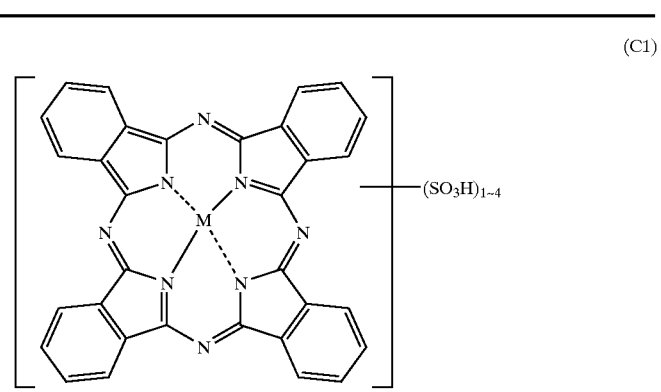

TABLE 2-3-continued

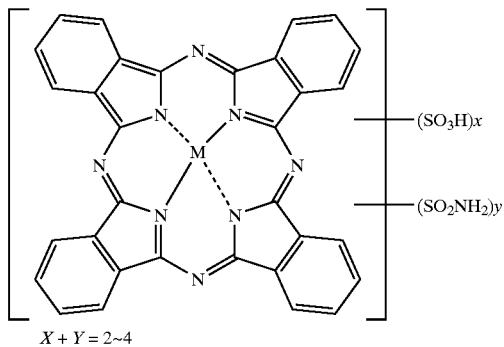

(C2)

X + Y = 2~4

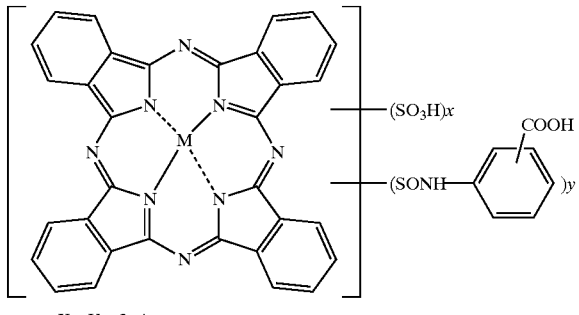

(C3)

X + Y = 2~4

TABLE 2-4

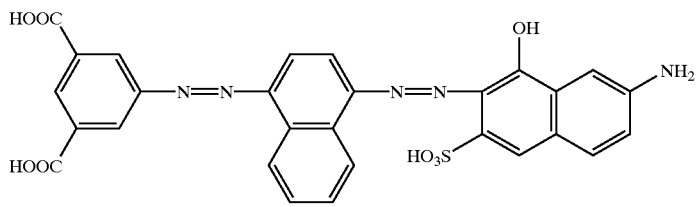

(Bk1)

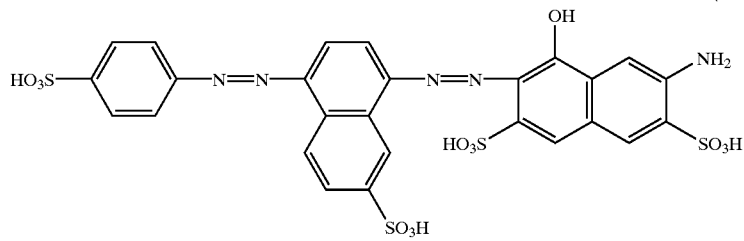

(Bk2)

Examples of pigments used in the present invention are as follows. Examples of organic pigments are as for azoes, phthalocyanines, anthraquinones, dioxazines, indigos, thioindigoes, perylenes, isoindolinones, aniline black, azomethines, rhodamine B lake pigment, and carbon black. Examples of inorganic pigments are as for ferric and ferrous oxides, titanium dioxide, calcium carbonate, barium sulfate, aluminum hydroxide, barium yellow, indigo blue, cadmium red, chrome yellow, and metal powder.

More specifically, examples of pigments for black are as for carbon black (C.I. Pigment Black 7) such as furnace black, lamp black, acetylene black and channel black; metallic materials such as copper oxide, iron oxide (C.I. Pigment Black 11) and titanium dioxide; and organic pigments such as aniline black (C.I. Pigment Black 1).

Examples of pigments for color ink are as follows. Examples of pigments for yellow ink are as for C.I. Pigment Yellow 1 (Fast Yellow G), 3, 12 (Disazo Yellow AAA), 13, 14, 17, 23, 24, 34, 35, 37, 42 (yellow iron oxide), 53, 55, 74, 81, 83 (Disazo Yellow HR), 95, 97, 98, 100, 101, 104, 108, 109, 110, 117, 120, 128, 138, 150, and 153. Examples of pigments for magenta are as for C.I. Pigment Red 1, 2, 3, 5, 17, 22 (Brilliant Fast Scarlet), 23, 31, 38, 48:2 (Permanent Red 2B (Ba)), 48:2 (Permanent Red 2B (Ca)), 48:3 (Permanent Red 2B (Sr)), 48:4 (Permanent Red 2B (Mn)), 49:1, 52:2, 53:1, 57:1 (Brilliant Carmine 6B), 60:1, 63:1, 63:2, 64:1, 81 (Rhodamine 6G lake), 83, 88, 92, 101 (red iron oxide), 104, 105, 106, 108 (cadmium red), 112, 114, 122 (dimethylquinacridone), 123, 146, 149, 166, 168, 170, 172, 177, 178, 179, 185, 190, 193, 209, and 219. Examples of pigments for cyan are as for C.I. Pigment Blue 1, 2, 15 (copper phthalocyanine blue R), 15:1, 15:2, 15:3 (phthalocyanine blue R), 15:4, 15:6 (phthalocyanine blue E), 16, 17:1, 56, 60, and 63.

For medium colors, the following pigments can be used alone or in combination for red, green and blue: C.I. Pigment Red 177, 194 and 224, C.I. Pigment Orange 43, C.I. Pigment Violet 3, 19, 23 and 37, C.I. Pigment Green 7 and 36 or the like.

For black, carbon black produced by a furnace method or a channel method and having an average particle size by the primary particles of 15 nm to 40 nm, a specific surface area of 50 to 300 $m^2/g$ according to a BET adsorption method, a DBP oil absorption of 40 to 150 ml/100 g, volatile content of 0.5 to 10% and pH of 2 to 9 is used as carbon black, and in particular, acid carbon black having pH 6 or less is preferable because of its high density. Carbon black treated with hypochlorous acid, carbon black treated with sulfonating agent, carbon black having a free anionic group such as sulfonic acid and carboxylic acid introduced by treating with a diazonium compound is more preferable. As yellow pigment, C.I., Pigment Yellow 74, 128, and 138, which contain no Benzidinyl skeleton, are preferable. As magenta pigment, quinacridone-based C.I., Pigment Red 122, and 209 are preferable. As cyan, C.I., Pigment Blue 15:3, aluminum-coordinated phthalocyanine, and metal-free phthalocyanine as phthalocyanine compounds, are preferable.

For these organic color pigments, where they have a sulfonic acid group or carboxylic acid being introduced, by for example a surface treatment, thereby the dispersion stability of the pigment therein is improved, and thereby they have a dispersion stability without dispersing agent, they should be used preferably as self-dispersing pigments. Furthermore, the use of pigments whose surfaces are capsulated, and the use of pigments in which polymer being grafted and the like, can change ink to an ink having excellent dispersion stability and high reliability.

Reference Example 1

Carbon Black Dispersing Liquid Treated with Hypochlorous Acid <1>

First, 300 g of commercially available acid carbon black of pH2.5 (manufactured by Cabot Corporation, under commodity name of MONARCH 1300) were mixed sufficiently in 1000 ml of water, and 450 g of sodium hypochlorite (available chlorine concentration of 12%) were dripped into the mixture, followed by stirring at 100 to 105° C. for eight hours. Then, 100 g of sodium hypochlorite (available chlorine concentration of 12%) were further added to this solution and the solution was dispersed by a lateral type of dispersing machine for three hours. The resultant slurry was diluted with water by a factor of 10, and the pH was adjusted with lithium hydroxide, followed by desalination and concentration with an ultrafiltration membrane until an electric conductivity of 0.2 mS/cc was reached. Thus, a carbon black dispersing liquid having a pigment concentration of 15% was obtained. Large particles were removed by centrifugation, and further the carbon black dispersing liquid was filtrated with a 1 micron nylon filter. The resultant carbon black dispersing liquid was denoted as carbon black dispersing liquid <1>. The total content of Fe, Ca and Si was 100 ppm or less according to ICP measurement. The concentration of chlorine ions was 10 ppm or less. The average particle size (D50%) measured by the Microtrack UPA was 95 nm.

Reference Example 2

Carbon Black Dispersing Liquid Treated with Sulfonating Agent <2>

First, 150 g of commercially available carbon black pigment (manufactured by Degussa Corporation, under product name of Printex#85) were mixed sufficiently in 400 ml of sulfolane, and the mixture was dispersed minutely by a ball mill. Then, 15 g of amidosulfuric acid were added to the mixture, followed by stirring at 140 to 150° C. for 10 hours. The resultant slurry was fed into 1000 ml of ion exchanged water and subjected to centrifugation at 12000 rpm so that a surface-treated carbon black wet cake was obtained. This carbon black wet cake was dispersed again in 2000 ml of ion exchanged water, and the pH was adjusted with lithium hydroxide, followed by desalination and concentration with an ultrafiltration membrane. Thus, a carbon black dispersing liquid having a pigment concentration of 10% was obtained. This liquid was filtrated with a 1 micron nylon filter, and the resultant liquid was denoted as carbon black dispersing liquid <2>. The total content of Fe, Ca and Si was 100 ppm or less according to ICP measurement. The concentration of sulfuric acid ions was also 100 ppm or less. The average particle size was 80 nm.

Reference Example 3

Carbon Black Dispersing Liquid Treated with Diazo Compound <3>

First, 100 g of carbon black having a specific surface area of 230 $m^2/g$ and a DBP oil absorption of 70 ml/100 g and 34 g of p-amino-N-benzoic acid were mixed and dispersed in 750 g of water, and 16 g of nitric acid were dripped to the mixture and stirred at 70° C. After five minutes holding, a solution of 11 g of sodium nitrite dissolved in 50 g of water was added thereto, followed by further stirring for one hour. The resultant slurry was diluted by a factor of 10, and subjected to centrifugation to remove large particles. The pH was adjusted to 8 to 9 with diethanolamine, followed by desalination and concentration with an ultrafiltration membrane. Thus, a carbon black dispersing liquid having a pigment concentration of 15% was obtained. This liquid was filtrated with a 0.5 μm polypropylene filter, and thus the resultant liquid was denoted as carbon black dispersing liquid <3>. The total content of Fe, Ca and Si was 100 ppm or less according to ICP measurement. The concentration of nitric acid ions was 10 ppm or less. The average particle size was 99 nm.

Reference Example 4

Carbon Black Dispersing Liquid Treated with Diazo Compound <4>

EXAMPLE 1

Preparation of Carbon Black Product

A solution at about 75° C. containing 2 liters of water and 43 g of sulfanilic acid was added to 202 g of carbon black having a surface area of 230 m²/g and a DBPA of 70 ml/100 g under stirring. This mixture was cooled to room temperature under stirring, and 26.2 g of concentrated nitric acid was added thereto. A solution of 20.5 g of sodium nitrite in water was added. A 4-sulfobenzenediazonium hydroxide inner salt was prepared and reacted with the carbon black. The dispersed system was stirred until bubbling was stopped. The resultant slurry was diluted, and the pH was adjusted to 8 to 9 with lithium hydroxide and large particles were removed by centrifugation, followed by desalination and concentration with an ultrafiltration membrane. Thus, a carbon black dispersing liquid having a pigment concentration of 15% was obtained. This liquid was filtrated with a 1 μm polypropylene filter, and thus the resultant liquid was denoted as carbon black dispersing liquid <4>. The total content of Fe, Ca and Si was 100 ppm or less according to ICP measurement. The concentration of nitric acid ions was 50 ppm or less. The average particle size was 95 nm.

Reference Example 5

Color Pigment Dispersing Liquid that been Subjected to Surface Chemical Treatment (Yellow Dispersing Liquid <1>, Magenta Dispersing Liquid <1>, Cyan Dispersing Liquid <1>)

As a yellow pigment, a pigment was prepared by treating C.I. Pigment Yellow 128 with low temperature plasma, and introducing a carboxylic acid group. A dispersing liquid of this pigment in ion exchanged water was subjected to desalination and concentration with an ultrafiltration membrane to provide a yellow pigment dispersing liquid <1> having a pigment concentration of 15%. The average particle size was 70 nm, and the total content of Fe, Ca and Si was 100 ppm or less.

In the same manner, a magenta dispersing liquid <1> having a pigment concentration of 15% was prepared as a magenta pigment, using C.I. Pigment Magenta 122. The average particle size was 60 nm, and the total content of Fe, Ca and Si was 100 ppm or less.

In similar manner, a cyan dispersing liquid <1> having a pigment concentration of 15% was prepared as a cyan pigment, using C.I. Pigment Cyan 15:3. The average particle size was 80 nm, and the total content of Fe, Ca and Si was 100 ppm or less.

In the present invention, a pigment dispersing liquid using a dispersant for pigment can be used. Examples of dispersants for pigment are as follows. As hydrophilic polymer, examples of natural polymer are as for vegetable polymers such as arabian gum, tragacanth gum, guar gum, karaya gum, locust bean gum, arabinogalactan, pectin and quince seed starch, seaweed polymers such as alginic acid, carrageenan and agar, animals polymers such as gelatin, casein, albumin and collagen, and microbial polymers such as xanthan gum and dextran. Examples of semisynthetic hydrophilic polymer are as for cellulose polymers such as methyl cellulose, ethyl cellulose, hydroxyethyl cellulose, hydroxypropyl cellulose and carboxymethyl cellulose, starch polymers such as sodium carboxymethyl starch and starch sodium phosphate ester and seaweed polymers such as sodium alginate and propylene glycol ester alginate. Examples of pure synthetic hydrophilic polymer are as for vinyl polymers such as poly vinylalcohol, poly vinylpyrrolidone and poly vinylmethyl ether, uncrosslinked polyacrylamide, polyacrylic acid and alkali metal salts thereof, acrylic resins such as water-soluble styrene acrylic resin, water-soluble styrene maleate resin, water-soluble vinylnaphthalene acrylic resin, water-soluble vinylnaphthalene maleate resin, polyvinylpyrrolidone, polyvinyl alcohol, alkali metal salt of β-naphthalenesulfonic acid formalin condensation product, high molecular weight compounds having salts of cationic functional groups such as quaternary ammonium and amino groups in their side chain and natural high molecular weight compounds such as shellac.

In particular, those to which a carboxylic acid group being introduced such as those containing copolymer of homopolymer of acrylic acid, methacrylic acid, and styrene acrylic acid or monomer having other hydrophilic groups are preferable as a high molecular weight dispersant.

In the case of using a surfactant, anionic surfactants such as polyoxyethylene alkyl ether phosphate, polyoxyethylene alkyl ether acetate, and nonionic surfactants such as nonylphenyl ether can be used.

Reference Example 6

Dispersant Pigment Dispersing Liquid (Surfactant Dispersion: Yellow Dispersing Liquid <2>, Magenta Dispersing Liquid <2>, Cyan Dispersing Liquid <2>, Polymer Dispersion: Yellow Dispersing Liquid <3>, Magenta Dispersing Liquid <3>, Cyan Dispersing Liquid <3>).

yellow pigment: C.I. Pigment Yellow 128, magenta pigment: C.I. Pigment Red 122, cyan pigment: C.I. Pigment Blue 15:3, dispersant A: nonionic surfactant manufactured by Kao Corporation, Emulgen 913), HLB15.5, dispersant B: acrylic resin aqueous solution manufactured by Johnson Polymer, Joncryl 611 (neutralized with ammonia, solid content of 20%), acid value of 57.

(1) Salt Milling Particle-Size Reduction Processing

First, 250 parts of the pigment, 2500 parts of sodium chloride and 200 parts of diethylene glycol were fed in a 1 gallon kneader made of stainless steel (manufactured by Inoue Seisakusho Co. Ltd.), and kneaded for three hours. Next, this mixture was fed into 2.5 liters of hot water, and was stirred by a high-speed mixer for about one hour while being heated to about 80° C. to be formed slurry. Then, filtration and washing with water were repeated five times to remove sodium chloride and the solvent, so that dry pigment was obtained.

(2) Surface Treatment Processing

First, 20 parts of the pigment, 5 parts (in terms of solid content) of the dispersants A and B and water were added to a paint conditioner such that the total amount was 100 parts and the mixture was dispersed for three hours. The resultant aqueous pigment dispersion was subjected to centrifugation at 15000 rpm for six hours.

Then, 0.1 parts of 30% ammonia water and 79.9 parts of purified water were added to 20 parts of the surface-treated pigment of Reference Example 5, and dispersed again in a paint conditioner, so that a pigment concentrated solution was prepared. For the pigment that had not been subjected to surface treatment, 5 parts (in terms of solid content) of the dispersants A (formulation 1) or the dispersant B (formulation 2) and purified water were added to 20 parts of the pigment such that the total amount was 100 parts and this mixture was dispersed in a paint condition, followed by purification with a reverse osmosis membrane. Thus, a concentrated recording liquid for inkjet was prepared. The concentrated liquid was filtrated with a 1 μm nylon filter and further filtrated with 0.5 μm polypropylene filter to provide a dispersing liquid for use. The content of Fe, Ca, and Si in all the cases was 100 ppm or less.

The average particle sizes of the dispersing liquids were as follows:

yellow dispersing liquid <2>: 93 nm
   yellow dispersing liquid <3>: 80 nm
   magenta dispersing liquid <2>: 60 nm
   magenta dispersing liquid <3>: 56 nm
   cyan dispersing liquid <2>: 90 nm
   cyan dispersing liquid <3>: 87 nm In the present invention, particles being colored by dyes or pigments is used as a coloring material so that the fixability and the color development on plain paper are improved, and the use of water-soluble calixarene of formula (1) associated with the colored particles leads to the preparation of recording liquid having the nature hard to be aggregated. As the colored particles, either high molecular weight particles or inorganic particles such as silica and alumina can be used. It is preferable to use high molecular weight particles for the purpose of providing an improved brightness.

In particular, it is preferable to use a colored high molecular weight material particles, such as particles based an acrylic or polyester impregnated with a dye or a pigment, that is, the particles in which a dye or a pigment may be present on a surface layer or in internal portion, or over whole body. A specific example is colored particles produced by a method disclosed in Japanese Unexamined Patent Publication No. 2000-53898. One example thereof close to these obtained by the disclosed method is as follows.

Reference Example 7

First, 20 parts by weight of methyl ethyl ketone as a polymerization solvent and monomer having the following composition for initial feeding as a polymeric unsaturated monomer and a polymerization chain transfer agent were fed in a sealable reaction vessel provided with stirring blade, a tube for cooling medium and a tube for introducing nitrogen gas, and nitrogen gas purge was performed sufficiently.

| | |
|---|---|
| methyl methacrylate, monomer | 12.8 parts by weight |
| 2-hydroxyethyl methacrylate, monomer | 1.2 parts by weight |
| methacrylic acid, monomer | 2.9 parts by weight |
| silicone macromer (Chisso Corporation, FM-0711) | 2 parts by weight |
| styrene-acrylonitrile macromer (Toagosei Co., Ltd., AN-6) | 1 parts by weight |
| mercaptoethanol (polymerization chain transfer agent) | 0.3 parts by weight |

The mixed solution in the reaction vessel was warmed to 65° C. while being stirred in a nitrogen atmosphere. Besides this processing, the following monomer for dropping into the vessel, following chain transfer agent for polymerization 60 parts of methyl ethyl ketone, and 0.2 parts of 2,2'-azobis (2,4-dimethyl valeronitrile) were mixed, and sufficient purge with nitrogen was performed, then the resultant mixed solution was gradually dripped in the reaction vessel over three hours.

| | |
|---|---|
| methyl methacrylate, monomer | 51 parts by weight |
| 2-hydroxyethyl methacrylate, monomer | 4.2 parts by weight |
| methacrylic acid, monomer | 11 parts by weight |
| silicone macromer (Chisso Corporation, FM-0711) | 8 parts by weight |
| styrene-acrylonitrile macromer (Toagosei Co., Ltd., AN-6) | 4 parts by weight |
| mercaptoethanol (polymerization chain transfer agent) | 1.2 parts by weight |

By two hour passing after finished dropping, a solution of 0.1 parts by weight of 2,2'-azobis(2,4•dimethyl valeronitrile) dissolved in 5 parts by weigh of methyl ethyl ketone was added thereto, and further aged at 65° C. for two hours and at 70° C. for two hours so that a vinyl based polymer solution was obtained.

A part of the obtained vinyl based polymer solution was dried at 105° C. for two hours under a vacuumed pressure to remove the solvent completely for isolation. Average molecular weight by the weight was about 10,000 and Tg was 180° C.

Then, obtained vinyl based polymer is dried under a vacuumed pressure to obtained the dried one, then, to 5 g of the vinyl based polymer obtained by the drying, 25 g of toluene and 5 g of anthraquinone dye having the following composition were added, and complete dissolving was made, and 2 g of a sodium hydroxide solution were added thereto to neutralize a part of the acidic groups of the vinyl based polymer. Then, 300 g of ion exchanged water was added thereto and the mixture was stirred, followed by emulsificating for 30 minutes using the Nanomaker TM (manufactured by Nanomizer Co., Ltd.), which is an emulsifying apparatus. Obtained emulsified product was concentrated by removing toluene completely at 60° C. under a vacuumed pressure, and removing a part of water. Then, impurities such as monomer were removed with an ultrafiltration membrane and thus a magenta dispersing liquid <4> of vinyl based polymer particles impregnated with purified dispersive dye (average particle size of 98 nm, a solid concentration of 10%) was obtained.

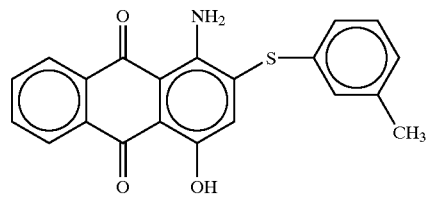

By use of similar manner with the exception of C.I. Disperse Yellow 118 as the dye, a yellow dispersing liquid <4> (average particle size of 98 nm, a solid concentration of 10%) was obtained, and also by use of similar manner with the exception of C.I. Disperse Blue 36 was used as the dye, a blue dispersing liquid <4> (average particle size of 98 nm, a solid concentration of 10%) was obtained.

In the present invention, the wettability to the recording paper can be improved by using a surfactant. Examples of preferable surfactants are as for interfacial polyoxyethylene alkyl ether acetate, dialkyl sulfosuccinate, polyoxyethylene alkyl ether, polyoxyethylene alkyl phenyl ether, polyoxyethylene polyoxypropylene block copolymer and acetylenic glycol based surfactants. More specifically, by using polyoxyethylene alkyl ether acetate (II) and/or dialkyl sulfosuccinate (III) having a branched alkyl chain with 5 to 7 carbon chains, the characteristics on plain paper can be improved, and the stability of dissolved and dispersed coloring agent further can be obtained.

R—O—(CH$_2$CH$_2$O)$_m$CH$_2$COOM  (II)

Where R represents an alkyl group having 6 to 14 carbon atoms that may be branched, and M represents an alkali metal ion, quaternary ammonium, quaternary phosphonium or alkanolamine, and m is 3 to 12.

  (III)

Where R$_5$ and R$_6$ represent branched alkyl groups having 5 to 7 carbon atoms, and M represents an alkali metal ion, quaternary ammonium, quaternary phosphonium or alkanolamine.

Furthermore, the surfactant exhibits excellent dissolution stability by using lithium ions, quaternary ammonium or quaternary phosphonium represented by the above mentioned general formula (I), as the counter ions of the surfactant in the present invention.

Examples of preferable nonionic surfactants are as for a surfactant of general formula (IV), which is polyoxyethylene alkyl phenyl ether, and a surfactant of general formula (V), which is an acetylenic glycol based surfactant. Utilizing them in combination of themselves, increases the permeability as a multiplier effect, and thus ink having reduced bleeding on the boundary of colors and a less blurring of printed letters can be obtained.

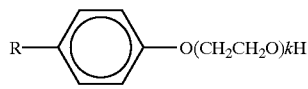  (IV)

Where R represents a carbon chain having 6 to 14 carbon atoms that may be branched, and k is 5 to 12.

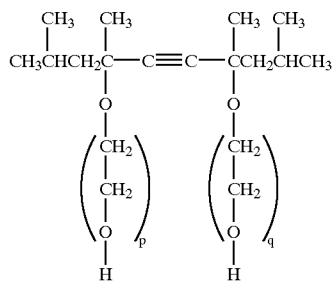  (V)

where p and q are 0 to 40.

When the pH of this ink is 6 or more, the storage stability of the ink can be obtained. The most parts of the electrography paper or letter papers used in offices have a pH of 5 or 6. In accordance with the present invention, the ink is ejected at a speed of 5 to 20 m/s in the form of droplets having an ejection weight of 2 ng to 50 ng from a fine outlet of 9 to 60 μm diameter on these kinds of paper for recording on so-called plain paper having a Stoeckigt Sizing Degree of 3 seconds or more according to the test method of JIS P-8122 with an adhered amount of a single color of 1.5 g/m$^2$ to 30 g/m$^2$, and thus a recording method for forming high quality and high resolution images can be realized. However, when pH is 9 or more, the properties may be changed easily with degradation of the surfactant of formula (III) during storage, therefor it is preferable that the pH is 6 to less than 9 when the surfactant of formula (III) is used.

The surfactants of an amount between 0.05 wt. % and 10 wt. % of formulae (II), (III), (IV) and (V) for addition in the present invention leads to a desired permeability to the ink with characteristics required by a printer system. An amount of 0.05% or less causes bleeding on the boundary portion where two colors are superimposed in all the cases. The use of an amount of 10 wt. % or more at a low temperature causes precipitating of the compound itself, which is a mark of poor reliability.

Next, Table 3 shows a list of tangible surfactants (II) and (III) of the present invention in the form of free acid.

TABLE 3-1

| | |
|---|---|
| CH$_3$(CH$_2$)$_{12}$O(CH$_2$CH$_2$O)$_3$CH$_2$COOH | (II-1) |
| CH$_3$(CH$_2$)$_{12}$O(CH$_2$CH$_2$O)$_4$CH$_2$COOH | (II-2) |
| CH$_3$(CH$_2$)$_{12}$O(CH$_2$CH$_2$O)$_5$CH$_2$COOH | (II-3) |
| CH$_3$(CH$_2$)$_{12}$O(CH$_2$CH$_2$O)$_6$CH$_2$COOH | (II-4) |
| CH$_3$(CH$_2$)$_{11}$CH(CH$_3$)O(CH$_2$CH$_2$O)$_6$CH$_2$COOH | (II-5) |
| CH$_3$(CH$_2$)$_6$CH((CH$_2$)$_5$CH$_3$)O(CH$_2$CH$_2$O)$_3$CH$_2$COOH | (II-6) |

TABLE 3-2

| | |
|---|---|
| HO$_3$S—CH(CH(CH$_3$)CH$_2$CH$_3$)COO—CH$_2$CH(CH$_3$)CH$_2$CH$_3$ with CH$_2$COOCH(CH$_3$)CH$_2$CH(CH$_3$)CH$_3$ branch | (III-1) |
| HO$_3$S—CH(CH(CH$_3$)CH$_2$CH$_2$CH$_2$CH$_3$)COO—CH(CH$_3$)CH$_2$CH$_2$CH$_2$CH$_3$ with CH$_2$COOCH(CH$_3$)CH$_2$CH$_2$CH$_2$CH$_3$ branch | (III-2) |
| HO$_3$S—CH(CH(CH$_3$)$_2$)COO—CH(CH(CH$_3$)$_2$) with CH$_2$COOCH(CH(CH$_3$)$_2$) branch | (III-3) |
| HO$_3$S—CH(CH$_2$CH(CH$_3$)$_2$)COOCH$_2$CH$_2$CH(CH$_3$)$_2$ with CH$_2$COOCH$_2$CH$_2$CH(CH$_3$)$_2$ branch | (III-4) |

For the ink of the present invention which is basically intended the use of colored particles, even where water is used as a liquid solvent, but the following water soluble organic solvents can be used for the purpose of providing the ink with the desired properties, for preventing the ink drying during production and recording, and for improving the dissolution stability of the compounds used in the present invention or the like. Examples thereof are as for polyhydric alcohols such as ethylene glycol, diethylene glycol, triethylene glycol, polyethylene glycol, polypropylene glycol, 1,3-propanediol, 1,3-butanediol, 1,4-butanediol, 1,2- pentanediol, 1,2-hexanediol, glycerol, 1,2,6-hexanetriol, 1,2,4-butanetriol, 1,2,3-butanetriol and petriol, polyhydric alcohol alkylethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether and propylene glycol monoethyl ether, polyhydric alcohol aryl ethers such as ethylene glycol monophenyl ether and ethylene glycol monobenzyl ether; nitrogen-containing heterocyclic compounds such as N-methyl-2-pyrrolidone, N-hydroxyethyl-2-pyrrolidone, 2-pyrrolidone, 1,3-dimethylimidazolidinone and ε-caprolactam; amides such as formamide, N-methylformamide, formamide and N,N-dimethylformamide; amines such as monoethanolamine, diethanolamine, triethanolamine, monoethylamine, diethylamine and triethylamine, sulfur-containing compounds such as dimethylsulfoxide, sulfolane and thiodiethanol, propylene carbonate, ethylene carbonate, γ-butyrolactone and the like. These solvents can be used alone or in combination with a plurality of them together with water.

Among these, particularly preferable examples are as for diethylene glycol, thiodiethanol, polyethylene glycol 200 to 600, triethylene glycol, glycerol, 1,2,6-hexanetriol, 1,2,4-butanetriol, petriol, 1,3-butanediol, 2,3-butanediol, 1,4-butanediol, 1,5-pentanediol, N-methyl-2-pyrrolidone, N-hydroxyethylpyrrolidone, 2-pyrrolidone and 1,3-dimethylimidazolidinone. With using the above, excellent effects can be obtained with high solubility of the compound of the present invention and avoiding of poor jetting caused by evaporation of water content.

In particular, in the present invention, preferable examples of the solvent to provide the dispersion stability of the coloring agent are as for pyrrolidone derivatives such as N-hydroxyethyl-2-pyrrolidone.

Furthermore, examples of penetrating agents to be added for the purpose of adjusting the surface tension other than the surfactants (II) to (V) are as for alkyl and aryl ethers of polyhydric alcohols such as diethylene glycol monophenyl ether, ethylene glycol monophenyl ether, ethylene glycol monoallyl ether, diethylene glycol monophenyl ether, diethylene glycol monobutyl ether, propylene glycol monobutyl ether, triethylene glycol monobutyl ether and tetraethylene glycol chlorophenyl ether, diols such as 2-ethyl-1,3-hexanediol, 2,2,4-trimethyl-1,3-pentanediol and 2,2-dimethyl-1,3-propanediol, polyoxyethylene polyoxypropylene block copolymer, fluorochemical surfactant, and lower alcohols such as ethanol and 2-propanol. Particularly preferable example are as for diethylene glycol monobutyl ether as a polyhydric alcohol alkyl ether, and 2-ethyl-1,3-hexanediol and 2,2,4-trimethyl-1,3-pentanediol as diols having 6 or more carbon atoms. Diols are suitable because they hardly cause water-insoluble coloring material to aggregate. The amount thereof to be added depends partly on the type and the desired properties, but they are added in a range of 0.1 to 20 wt. %, and preferably 0.5 to 10 wt. %. At an amount of less than the lower limit, the permeability is insufficient, and an amount of more than the upper limit adversely affects the characteristics for forming particles. Furthermore, the addition of them improves the wettability to the ink jet head members or recording instruments so that the filling properties are improved, and thus poor recording due to bubbles hardly occurs.

The properties of the ink of the present invention can be adjusted as appropriate for the system. Herein, the surface tension of ink is an indicator that indicates the permeability into paper, and measuring of dynamic surface tension of ink should be conducted with in short time of one or less second after the surface to be measure is prepared, thereby determined value well corresponds to the permeability of the ink measured. This is different from figures on a static surface tension determined by the period of time consumed in reaching saturation. The dynamic surface tension can be measured according to any of conventionally known methods such as one described in Japanese Unexamined Patent Publication (Tokkai) No. 63-31237 that enables to measure a dynamic surface tension with in short time as period of one second or less. The surface tension is preferably 50 mN/m or less, more preferably 40 mN/m or less, for excellent drying properties. On the other hand, in view of the stability of the ejecting of the ink drops, if the dynamic surface tension is too low, unstable forming of liquid particles is brought. The dynamic surface tension allowing stable ejection is preferably 40 mN/m or more at 1 ms.

The viscosity range can be selected with appropriateness between 1 mPa·s and 10 mPa·s, depending on the ejection method.

Regarding the range of the pigment particle size of the ink, particles with 10 nm to 300 nm are used, and an average particle size of 60 nm to 120 nm is preferable, The solid content of a range from 1 to 25 wt. % in the ink is preferable, and the water content in a range from 25 to 93 wt. % is preferable, more preferably 50 to 80 wt. %.

In the present invention, a range of the conductivity that does not impair the dispersion stability is desired, and in view of the ξ electric potential of particles colored by pigments or dyes and existing in the ink, preferable electric conductivity of the ink is 1 mS/cm to 6 mS/cm, thereby dispersibility of the particles in ink is satisfied, therefore the ink is rendered to highly reliable one showing only small change in particle size over long time of period, consequently high enough reliability is attained with its ink.

As a rule, attempts to add an agent or the like for adjusting conductivity have been envisaged, in order to make the conductivity close to above mentioned range, however, above mentioned compound of formula (1) in the present invention has free type of and different kinds of groups, and an adjusting of the content of the free groups makes it possible to hold the conductivity in above mentioned range. Furthermore, a fine adjustment concerned it, is can be attained by adding an agent for adjusting the conductivity which doesn't inhibit dispersibility. Preferable examples of this type of conductivity adjusting agent are as for quaternary ammonium salts such as tetramethyl ammonium chlorides, and alkanolamine salts.

In addition to the coloring agent and the solvent as described above, conventionally known additives can be added to the ink of the present invention. For example, as an antiseptic or an antifungal agent, sodium dehydroacetate, sodium sorbate, 2-pyridinethiol-1-oxide sodium, sodium benzoate, pentachlorophenol sodium, isothiazoline and the like can be used in the present invention.

As a pH adjusting agent, any substance can be used, as long as it can adjust the pH to 7 or more without adversely affecting the ink.

Tangible examples are as for amines such as diethanolamine and triethanolamine, hydroxides of alkali metal elements such as lithium hydroxide, sodium hydroxide and potassium hydroxide, ammonium hydroxide, quaternary ammonium hydroxide, quaternary phosphonium hydroxide, carbonates of alkali metals such as lithium carbonate, sodium carbonate and potassium carbonate.

As chelating reagents, for example, sodium ethylenediamine tetraacetate, sodium nitrilotriacetate, sodium hydroxyethyl ethylenediaminetriacetate, sodium diethylenetriaminepentaacetate, sodium uramil diacetate and the like can be used.

As rust-preventive agents, acid sulfite, sodium thiosulfate, ammonium thiodiglycolate, diisopropyl ammonium nitrite, pentaerythritol tetranitrate, dicyclohexylammonium nitrite and the like can be used.

Other than the above, water-soluble ultraviolet absorber, or water-soluble infrared absorber can be added, depending on the purposes of application.

DESCRIPTION OF THE PREFERRED EMBODIMENTS

Hereinafter, an example of an inkjet recording apparatus of the present invention be described. The apparatus is suitable for recording with the above mentioned aqueous pigment ink of the present invention.

Figure 1:
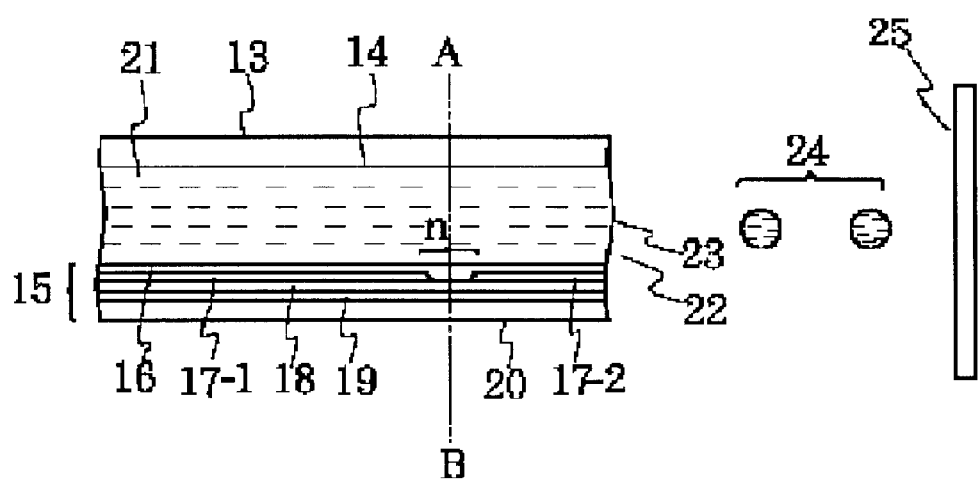
FIG. 1 is a cross-sectional view of an inkjet head to which the present invention is applied.

First, referring to FIG. 1, the illustrated shows an example of a configuration of a head, which is a primary part of the inkjet recording apparatus utilizing thermal energy. FIG. 1 is a cross-sectional view of a head (13) taken along an ink channel. The head (13) can be prepared by fixing or by adhering a glass, ceramic, silicon, or plastic plate or the like having a channel (nozzle) (14) to drive out ink, with a heater element substrate (15). The heater element substrate (15) may include a protective layer (16) formed by silicon oxide, silicon nitride, silicon carbide or the like; electrodes (17-1) and (17-2) formed by aluminum, gold, an aluminum-copper alloy or the like; a heat resistor layer (18) formed by material having a high melting point such as $HfB_2$, TaN, and TaAl; a heat reservior layer (19) formed by thermally oxidized silicon oxide, aluminum oxide or the like; and a substrate (20) formed by a material having good heat releasing properties such as silicon, aluminum, and aluminum nitride.

By applying of electric pulses to the electrodes (17-1) and (17-2) of the head (13), rapid heat generation undergoes at the region marked by a signal "n" of the heater element substrate (15), and thereby bubbles occur from ink (21) being contacted with the region of substrate's surface, and a meniscus (23) is projected by the pressure caused by the bubbles. Then, the ink (21) is ejected through a nozzle (14) of the head and is jetted out toward a recording material (25) in the form of droplets (24) from an outlet orifice (22).

Figure 2:
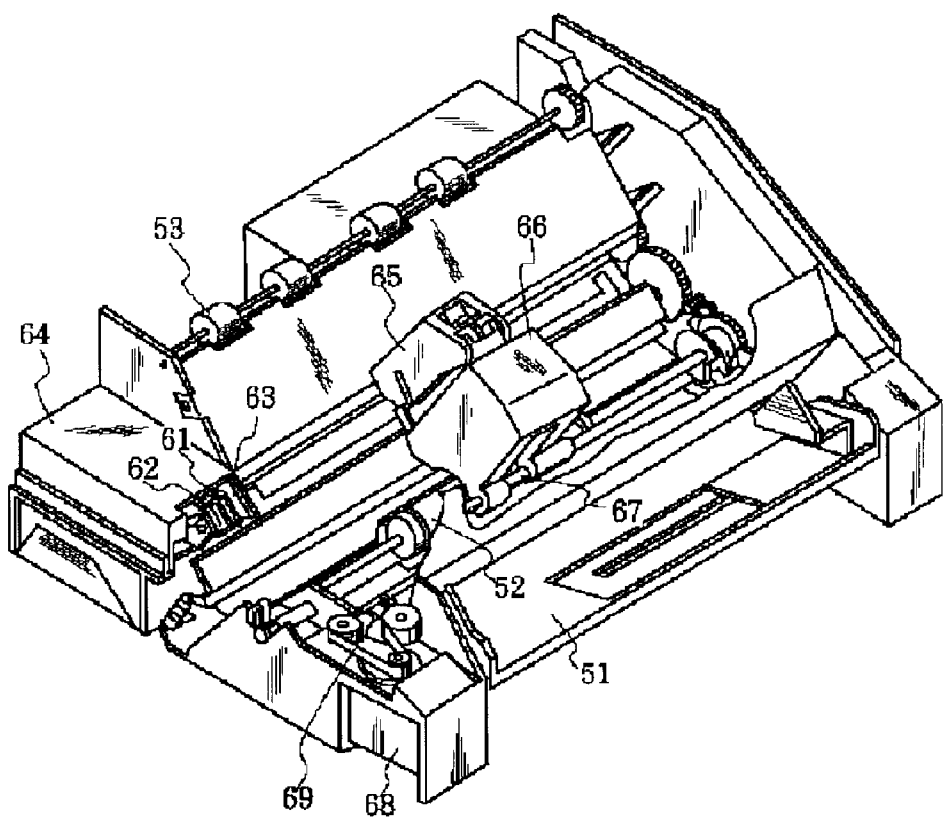
FIG. 2 is a view showing an example of an inkjet recording apparatus to which the head of FIG. 1 is incorporated.

FIG. 2 shows an example of the inkjet recording apparatus to which above mentioned head is incorporated. In FIG. 2, a blade (61) is a wiper member, and one end of the blade(61) is fixed by a blade holding member, which is in form of a cantilever. The blade (61) is located in a position adjacent to recording area where the recording head (65) is movable, blade (61) is held in projecting in a moving path of the recording head (65) in this example.

A cap (62) for the projected face of the recording head (65) is located in a home position adjacent to the blade (61). The cap is configured so as to move in the direction perpendicular to the moving direction of the recording head (65) to be in contact with the ink outlet face for capping. An ink absorbing member (63) provided adjacent to the blade (61) is held in projecting in the moving path of the recording head (65), in a similar manner to the blade (61). The blade (61), the cap (62) and the ink absorbing member (63) constitute an ejected recovery portion (64), and moistures, stains, and the like positioned in the recording head on the ink outlet face are removed by the blade (61) and the ink absorbing member (63).

The recording head (65) has an energy generating means for ejecting, and ejects ink onto a recording material opposing the outlet face provided with an outlet, and a carriage (66) carries the recording head (65) and makes moving of the recording head (65). The carriage (66) is slidably engaged in a guide axis (67), and a part of the carriage (66) is connected to a belt (69) driven by a motor (68) (not shown). Thus, the carriage (66) can be moved, along the guide axis (67) so as to move in the recording area, by the recording head (65) and the adjacent portion.

A recording material is inserted into a paper supplier portion (51). A paper feeder roller (52) is driven by the motor (not shown). With this configuration, the recording material can be fed to a position opposing the outlet face of the recording head (65), and paper is conveyed to a paper delivery portion provided with a paper delivery roller (53) as the recording proceeds. In the above configuration, when the recording head (65) is returned to the home position by ending of recording, the cap (62) of the ejected recovery portion (64) stays back from the moving path of the recording head (65), whereas the blade (61) projects into the moving pat, a result, the outlet of the recording head (65) is wiped.

For capping by the cap (62) being contacted with the outlet face of the recording head (65), the cap (62) moves so as to project out into the moving path of the recording head. When the recording head (65) moves from the home position to the starting record position, the cap (62) and the blade (61) are in the same positions as those for wiping as described above. Therefore, also in this movement, the outlet face of the recording head (65) can be wiped. The recording head moves to the home position not only at the end of recording or for ejection recovery, but also the recording head moves to the home position adjacent to the recording area by a predetermined interval With this mechanism, while the recording head moves in the recording area for recording, this movement allows the recording head to be wiped.

Figure 3:
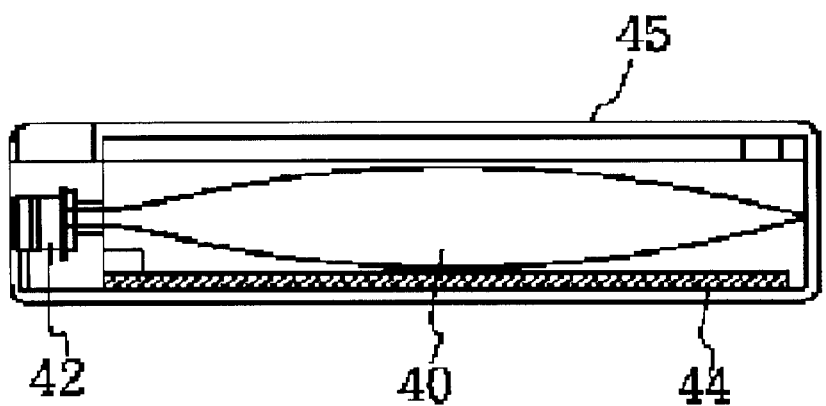
FIG. 3 is a view showing an example of an ink cartridge accommodating ink to be supplied through a tube.

FIG. 3 is a view showing an example of an ink cartridge containing ink to be supplied to the recording head via an ink supplier member, for example, a tube. An ink reservoir (40) contains ink to be supplied, and is, for example, an ink bag, and a rubber stopper (42) is provided at the end of the ink reservoir (40). The ink in the ink bag (40) can be supplied to the head by inserting a needle (not shown) into the stopper (42). An ink absorber member (44) receives waste ink. It is preferable that the face to be contact with the ink of the ink reservoir is formed by polyolefins, especially polyethylene.

Figure 4:
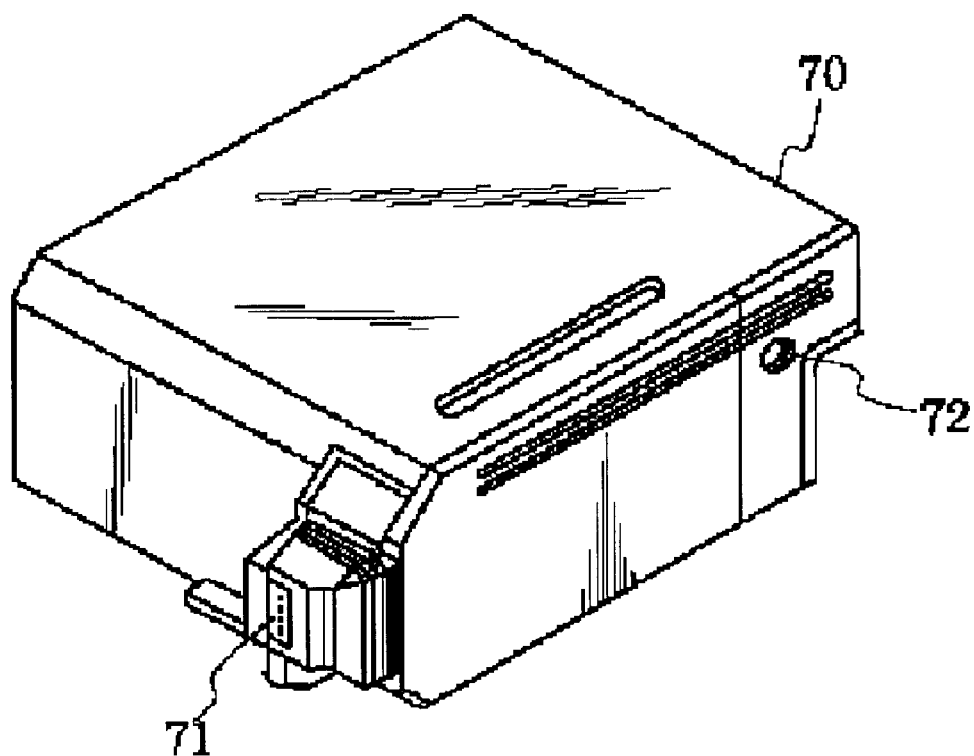
FIG. 4 is a view showing an example of an inkjet recording apparatus in which a head and an ink cartridge are combined that is used in the present invention.

In the above described example as the inkjet recording apparatus used in the present invention, the head and the ink cartridge are in separated. However, upon not only this type of apparatus, but also an apparatus, it is preferable that they are integrated to one unit, as shown in FIG. 4. In FIG. 4, a recording unit (70) accommodates with an ink reservoir to be contain ink therein, It may be such as an ink absorbing member. The ink in the ink absorber member is ejected in form of droplets from a head portion (71) having a plurality of orifices. It is preferable in the present invention that the ink absorber member is formed by polyurethane, cellulose, polyvinyl acetate or polyolefin based resin. Alternatively, instead of using the ink absorber member, an ink bag including a spring in its inside can be used as the ink reservoir. The apparatus is provided with an air communicating port (72) for communicating the air to the inside of the cartridge. This recording unit (70) is removable with respect to the carriage (66) so as to be used instead of the recording head (65) shown in FIG. 2.

Figure 5:
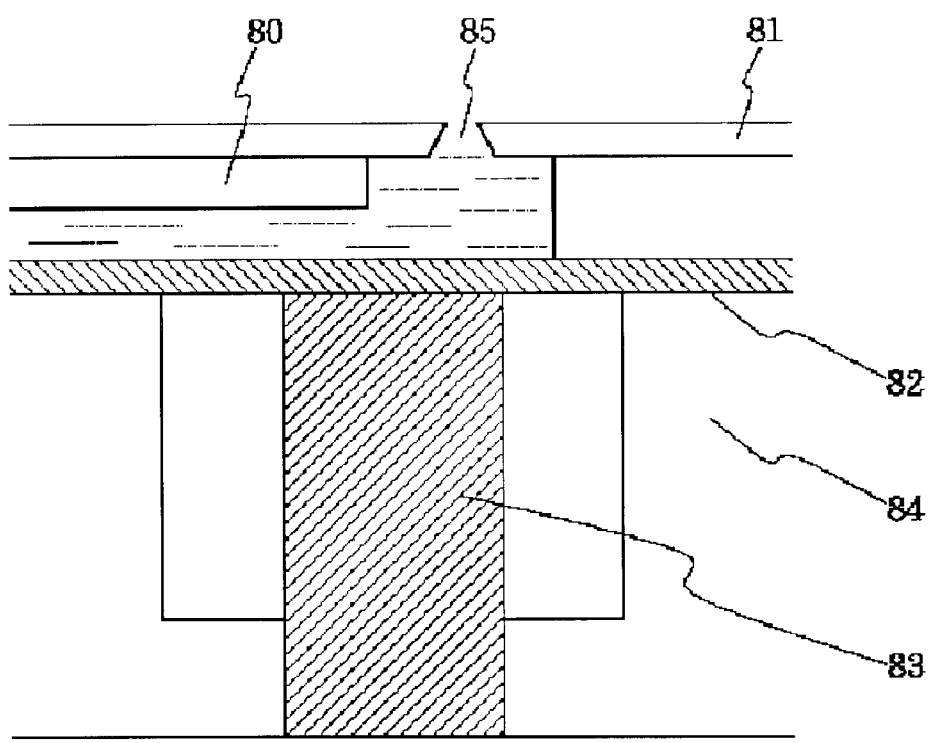
FIG. 5 is a view showing an example of a configuration of a recording head of the present invention.

Another preferable example of the inkjet recording apparatus utilizing dynamic energy is an on-demand-inkjet recording apparatus including a nozzle forming substrate having a plurality of nozzles, a pressure generating element opposed to the nozzles that is made of piezoelectric material and conductive material, and ink filled in the circumference of the pressure generating element. In this apparatus, a voltage is applied to displace the pressure generating element, so that ink is ejected in form of small droplets from the nozzles. FIG. 5 shows an example of a configuration of the recording head, which is a primary part of the recording apparatus.

The head includes an ink channel (80) communicating with an ink compartment (not shown), an orifice plate (81) for ejecting ink droplets with a desired volume, a vibration plate (82) for applying a pressure directly to the ink, a piezoelectric device (83) joined with the vibration plate (82) and displaced by an electric signal applying, and a substrate (84) for supporting and for securing the orifice plate (81), the vibration plate (82) etc.

In FIG. 5, the ink channel (80) is formed by a photosensitive resin or similar material, and the orifice plate (81) is provided with an ink outlet (85), for example, by subjecting a metal such as stainless steel and nickel, to electroplating or press working to form holes, and is provided with an ink-repellant layer made by eutectic plating of PTFE nickel on its surface. The vibration plate (82) is formed of a metal film of stainless steel, nickel, titanium or the like, and a high modulus resin film or the like, and the piezoelectric device (83) is formed of a dielectric material such as barium titanate and PZT. The recording head having the above constitution operates in the following manner. A voltage pulse is applied to the piezoelectric device (83) to generate distortion stress. This energy deforms the vibrating plate joined with the piezoelectric device (83), and the ink in the ink channel (80) is pressed vertically so that ink droplets (not shown) are ejected from the ink outlet (85) of the orifice plate (81) for recording. This recording head is incorporated into an inkjet recording apparatus as shown in FIG. 4 for use. The operation of the other components of the inkjet recording apparatus may be the same as in the above example.

Figure 6:
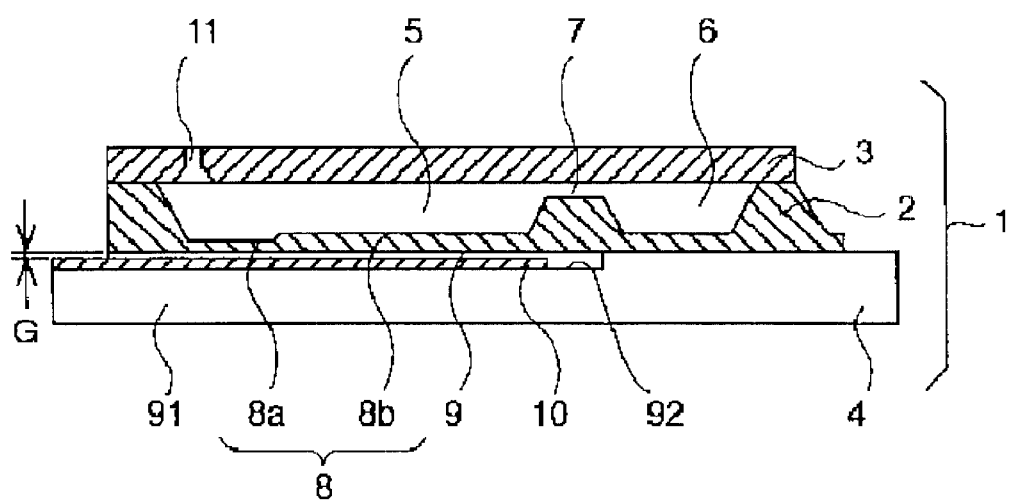
FIG. 6 is a cross-sectional view of an inkjet head to which the present invention is applied.

As another preferable example of the inkjet recording apparatus utilizing dynamic energy, an inkjet apparatus using an electrostatic actuator will be described. FIG. 6 is a cross-sectional view of an inkjet head to which the present invention is applied. As shown in FIG. 6, an inkjet head (1) a three layer structure in which silicon substrate (2) is sandwiched by a nozzle plate (3) made of silicon on the upper side and a boron silicate glass substrate (4) having a coefficient of thermal expansion close to that of silicon on the lower side. In the central silicon substrate (2), grooves for a plurality of independent ink compartments (5), a shared ink compartment (6) shared by these ink compartments and an ink supplier path (7) for connecting the shared ink compartment (6) to the plurality of ink compartments (5) are formed by etching from the surface (the upper side in FIG. 6). These grooves are covered with the nozzle plate so that the portions (5), (6) and (7) are defined.

In the nozzle plate (3), an ink nozzle (11) is formed in the position corresponding to a portion on the front end of each ink compartment (5), and is in communication with the corresponding ink compartment (5). An ink supply port in communication with the shared ink compartment is formed in the ink plate (3). The ink is supplied from an external ink tank (not shown) to the shared ink compartment (6) through the ink supply port. The ink supplied to the shared ink compartment (6) is supplied to the ink compartments (5) independent from each other through the ink supply path (7).

The ink compartments (5) are formed thin so that their bottom wall (8) can act as a diaphragm that is elastically displaceable vertically in FIG. 6. Therefore, this portion of the bottom wall (8) is also referred to as "diaphragm" for convenience in the following description.

In an area of the glass substrate (4) to be, by time, contacted with the lower surface of the silicon substrate (2), the upper surface thereof, that is, the surface area to be contacted with the silicon substrate (2) is provided with etched shallow recess (9) in positions corresponding to each ink compartment (5) of the silicon substrate (2). Therefore, the bottom wall (8) of each ink compartment (5) is opposed to the surface (92) of the recess (9) of the glass substrate (4), with a very small gap between them.

Since the recess (9) of the glass substrate (4) is opposed to the bottom wall (8) of the ink compartment (5), the recess (9) is also referred to as "vibration plate opposing wall" or simply "opposing wall" (91).

In this example, the bottom wall (8) of each ink compartment (5) acts as an electrode for storing electric charges. A segment electrode (10) is formed on the surface (92) of the recess (9) of the glass substrate (4) so as to be opposed to the bottom wall (8) of each ink compartment (5). The surface of each segment electrode (10) is covered with an insulating layer having a thickness of (G) made of inorganic glass. Thus, the segment electrode (10) and each ink compartment bottom wall (8) constitute counter electrodes (a distance between the electrodes of G) with the insulating layer (9) interposed between them.

EXAMPLES

Hereinafter shows examples and comparative examples of the present invention.

Example 1

Black ink [1] was prepared by mixing materials in the following composition, allowing the mixture to stand for one day, adjusting the pH to 9 with the compound of specific example (I-1), and filtrating it with a 0.5 μm polypropylene filter.

| | |
|---|---|
| carbon dispersing liquid <1> | 5 wt. % as the solid concentration in the ink |
| compound of formula (1), where n = 4 | 1.5 wt. % |
| compound of specific example (I-1) | 0.1 wt. % |
| glycerol | 15 wt. % |

| | |
|---|---|
| N-hydroxyethylpyrrolidone | 5 wt. % |
| 2-ethyl-1,3-hexanediol | 1 wt. % |
| surfactant of specific example (II-2) | 1 wt. % |
| sodium dehydroacetate | 0.2 wt. % |
| highly purified water (10 MΩ) | balance |

The concentrations of the dispersing liquid and the dye are indicated by the concentration of the solid content of the coloring material in the following examples.

Example 2

Black ink [2] was prepared in the same manner as in Example 1 with the exception of the following composition was used and the pH was adjusted to 8.8 with lithium hydroxide.

| | |
|---|---|
| carbon dispersing liquid <2> | 4 wt. % |
| compound of formula (1), where n = 6 | 1.2 wt. % |
| 1,2,6-hexanetriol | 8 wt. % |
| 1,5-pentanediol | 8 wt. % |
| 2-pyrrolidone | 8 wt. % |
| surfactant of specific example (II-3) | 1.0 wt. % |
| surfactant of specific example (III-1) | 1.2 wt. % |
| 25% aqueous solution of specific example (I-3) | 0.8 wt. % |
| urea | 5 wt. % |
| 2-pyridinethiol-1-oxide sodium | 0.2 wt. % |
| highly purified water (10 MΩ) | balance |

Example 3

Black ink [3] was prepared in the same manner as in Example 1 with the exception of the following composition was used and the pH was adjusted to 8.5 with lithium hydroxide.

| | |
|---|---|
| carbon dispersing liquid <3> | 4.5 wt. % |
| compound of formula (1), where n = 8 | 1 wt. % |
| diethylene glycol | 5 wt. % |
| glycerol | 5 wt. % |
| 2-pyrrolidone | 2 wt. % |
| styrene acrylate polymer | 0.5 wt. % |
| surfactant of specific example (II-2) | 1 wt. % |
| surfactant of specific example (IV) (R: $C_9H_{19}$, k: 12) | 1 wt. % |
| 25% aqueous solution of specific example (I-3) | 0.2 wt. % |
| sodium dehydroacetate | 0.2 wt. % |
| ion exchanged water | balance |

Example 4

Yellow ink [1] was prepared in the same manner as in Example 1 with the exception of the following composition was used and the pH was adjusted to 9.5 with lithium hydroxide.

| | |
|---|---|
| yellow dispersing liquid <1> | 1.0 wt. % |
| compound of formula (1), where n = 6 | 1.2 wt. % |
| ethylene glycol | 5 wt. % |
| glycerol | 2 wt. % |
| 1,5-pentanediol | 8 wt. % |
| 2-pyrrolidone | 2 wt. % |
| polyoxyethylene polyoxyethylene block copolymer | 1 wt. % |
| surfactant of specific example (II-4) | 1 wt. % |
| surfactant of specific example (V) (p, q = 20) | 0.8 wt. % |
| 25% aqueous solution of specific example (I-4) | 2 wt. % |
| urea | 5 wt. % |
| sodium benzoate | 0.2 wt. % |
| ion exchanged water | balance |

Magenta ink [1] was prepared in the same manner as in Example 1 with the exception of the following composition was used and the pH was adjusted to 9.1 with lithium hydroxide.

| | |
|---|---|
| magenta dispersing liquid <1> | 1.0 wt. % |
| compound of formula (1), where n = 6 | 1.2 wt. % |
| ethylene glycol | 5 wt. % |
| glycerol | 15 wt. % |
| 2-pyrrolidone | 2 wt. % |
| polyoxyethylene polyoxyethylene block copolymer | 1 wt. % |
| surfactant of specific example (II-4) | 1 wt. % |
| surfactant of specific example (V) (p, q 20) | 0.8 wt. % |
| 25% aqueous solution of specific example (I-4) | 2 wt. % |
| urea | 5 wt. % |
| sodium benzoate | 0.2 wt. % |
| ion exchanged water | balance |

Cyan ink [1] was prepared in the same manner as in Example 1 with the exception of the following composition was used and the pH was adjusted to 9.1 with lithium hydroxide.

| | |
|---|---|
| cyan dispersing liquid <1> | 5 wt. % |
| compound of formula (1), where n = 6 | 1.5 wt. % |
| compound of specific example (I-1) | 0.1 wt. % |
| glycerol | 15 wt. % |
| N-hydroxyethylpyrrolidone | 5 wt. % |
| 2-ethyl-1,3-hexanediol | 1 wt. % |
| surfactant of specific example (II-2) | 1 wt. % |
| sodium dehydroacetate | 0.2 wt. % |
| highly purified water (10 MΩ) | balance |

Example 5

Yellow ink [2] was prepared in the same manner as in Example 1 with the exception of the following composition was used and the pH was adjusted to 7.8 with lithium hydroxide.

| | |
|---|---|
| yellow dispersing liquid <2> | 3 wt. % |
| compound of formula (1), where n = 8 | 1 wt. % |
| triethylene glycol | 5 wt. % |
| petriol | 10 wt. % |
| N-methyl-2-pyrrolidone | 5 wt. % |
| diethylene glycol monobutyl ether | 2 wt. % |
| compound of specific example (I-5) | 0.4 wt. % |
| surfactant of specific example (IV) (R: $C_{10}H_{21}$, K: 7) | 1 wt. % |
| 25% aqueous solution of specific example (I-2) | 1.5 wt. % |
| hydroxyethyl urea | 5 wt. % |
| 2-pyridinethiol-1-oxide sodium | 0.2 wt. % |
| ion exchanged water | balance |

Magenta ink [2] was prepared in the same manner as in Example 1 with the exception of the following composition was used and the pH was adjusted to 7.8 with lithium hydroxide.

| magenta dispersing liquid <2> | 3 wt. % |
|---|---|
| compound of formula (1), where n = 8 | 1 wt. % |
| triethylene glycol | 5 wt. % |
| petriol | 10 wt. % |
| N-methyl-2-pyrrolidone | 5 wt. % |
| diethylene glycol monobutyl ether | 2 wt. % |
| compound of specific example (I-5) | 0.4 wt. % |
| surfactant of specific example (IV) (R: $C_{10}H_{21}$, K: 7) | 1 wt. % |
| 25% aqueous solution of specific example (I-2) | 1.5 wt. % |
| hydroxyethyl urea | 5 wt. % |
| 2-pyridinethiol-1-oxide sodium | 0.2 wt. % |
| ion exchanged water | balance |

Cyan ink [2] was prepared in the same manner as in Example 1 with the exception of the following composition was used and the pH was adjusted to 7.8 with lithium hydroxide.

| cyan dispersing liquid <2> | 4 wt. % |
|---|---|
| compound of formula (1), where n = 8 | 1 wt. % |
| triethylene glycol | 5 wt. % |
| petriol | 10 wt. % |
| N-methyl-2-pyrrolidone | 5 wt. % |
| diethylene glycol monobutyl ether | 2 wt. % |
| compound of specific example (I-5) | 1 wt. % |
| surfactant of specific example (V) (R: $C_{10}H_{21}$, K: 7) | 1 wt. % |
| 25% aqueous solution of specific example (I-2) | 1.5 wt. % |
| hydroxyethyl urea | 5 wt. % |
| 2-pyridinethiol-1-oxide sodium | 0.2 wt. % |
| ion exchanged water | balance |

Example 6

Yellow ink [3] was prepared in the same manner as in Example 1 with the exception of the following composition was used and the pH was adjusted to 8 with lithium hydroxide.

| yellow dispersing liquid <3> | 4 wt. % |
|---|---|
| compound of formula (1), where n = 6 | 1 wt. % |
| 2-pyrrolidone | 8 wt. % |
| glycerol | 7 wt. % |
| 1,3-butanediol | 3 wt. % |
| surfactant of specific example (II-1) | 0.3 wt. % |
| surfactant of specific example (IV) (p + q = 15) | 0.5 wt. % |
| surfactant of specific example (IV) (p + q = 0) | 0.5 wt. % |
| 25% aqueous solution of specific example (I-7) | 2 wt. % |
| hydroxyethyl urea | 5 wt. % |
| sodium dehydroacetate | 0.2 wt. % |
| ion exchanged water | balance |

Magenta ink [3] was prepared in the same manner as in Example 1 with the exception of the following composition was used and the pH was adjusted to 8 with lithium hydroxide.

| magenta dispersing liquid <3> | 4 wt. % |
|---|---|
| compound of formula (1), where n = 6 | 3 wt. % |
| 2-pyrrolidone | 8 wt. % |
| glycerol | 7 wt. % |
| 1,3-butanediol | 3 wt. % |
| surfactant of specific example (I-1) | 0.3 wt. % |
| surfactant of specific example (IV) (p + q = 15) | 0.5 wt. % |
| surfactant of specific example (IV) (p + q = 0) | 0.5 wt. % |
| 25% aqueous solution of specific example (I-7) | 2 wt. % |
| hydroxyethyl urea | 5 wt. % |
| sodium dehydroacetate | 0.2 wt. % |
| ion exchanged water | balance |

Cyan ink [3] was prepared in the same manner as in Example 1 with the exception of the following composition was used and the pH was adjusted to 8 with lithium hydroxide.

| cyan dispersing liquid <3> | 4 wt. % |
|---|---|
| compound of formula (1), where n = 6 | 2 wt. % |
| 2-pyrrolidone | 8 wt. % |
| glycerol | 7 wt. % |
| 1,3-butanediol | 3 wt. % |
| surfactant of specific example (II-1) | 0.3 wt. % |
| tetramethylammonium nitrate (conductivity adjusting agent) | 0.4 wt. % |
| surfactant of specific example (IV) (p + q = 15) | 0.5 wt. % |
| surfactant of specific example (IV) (p + q = 0) | 0.5 wt. % |
| 25% aqueous solution of specific example (I-7) | 2 wt. % |
| hydroxyethyl urea | 5 wt. % |
| sodium dehydroacetate | 0.2 wt. % |
| ion exchanged water | balance |

Example 7

Yellow ink [4] was prepared in the same manner as in Example 1 with the exception of the following composition was used and the pH was adjusted to 9.5 with lithium hydroxide.

| yellow dispersing liquid <4> | 1.0 wt. % |
|---|---|
| compound of formula (1), where n = 8 | 1.2 wt. % |
| ethylene glycol | 5 wt. % |
| glycerol | 2 wt. % |
| 1,3-propanediol | 8 wt. % |
| 2-pyrrolidone | 2 wt. % |
| polyoxyethylene polyoxyethylene block copolymer | 1 wt. % |
| surfactant of specific example (II-4) | 0.5 wt. % |
| 25% aqueous solution of specific example (I-4) | 2 wt. % |
| urea | 5 wt. % |
| sodium benzoate | 0.2 wt. % |
| ion exchanged water | balance |

Magenta ink [4] was prepared in the same manner as in Example 1 with the exception of the following composition was used and the pH was adjusted to 9.1 with lithium hydroxide.

| magenta dispersing liquid <4> | 1.0 wt. % |
|---|---|
| compound of formula (1), where n = 6 | 1.2 wt. % |
| ethylene glycol | 5 wt. % |
| glycerol | 15 wt. % |
| 2-pyrrolidone | 2 wt. % |
| polyoxyethylene polyoxyethylene block copolymer | 1 wt. % |
| surfactant of specific example (II-4) | 0.3 wt. % |
| surfactant of specific example (V) (p, q = 20) | 0.2 wt. % |
| 25% aqueous solution of specific example (I-4) | 2 wt. % |
| urea | 5 wt. % |
| sodium benzoate | 0.2 wt. % |
| ion exchanged water | balance |

Cyan ink [4] was prepared in the same manner as in Example 1 with the exception of the following composition was used and the pH was adjusted to 8.4 with lithium hydroxide.

| | |
|---|---|
| cyan dispersing liquid <4> | 5 wt. % |
| compound of formula (1), where n = 6 | 1.5 wt. % |
| compound of specific example (I-1) | 0.1 wt. % |
| glycerol | 15 wt. % |
| N-hydroxyethylpyrrolidone | 5 wt. % |
| 2-ethyl-1,3-hexanediol | 1 wt. % |
| surfactant of specific example (II-2) | 1 wt. % |
| sodium dehydroacetate | 0.2 wt. % |
| highly purified water (10 MΩ) | balance |

Example 8

Yellow ink [5] was prepared in the same manner as in Example 1 with the exception of the following composition was used and the pH was adjusted to 7.8 with lithium hydroxide.

| | |
|---|---|
| dye of specific example (Y1) | 1 wt. % |
| dye of specific example (Y2) | 1 wt. % |
| compound of formula (1), where n = 8 | 1 wt. % |
| magnesium nitrate | 6 wt. % |
| 1,5-pentanediol | 5 wt. % |
| trimethylolpropane | 7 wt. % |
| 2-pyrrolidone | 5 wt. % |
| diethylene glycol monobutyl ether | 2 wt. % |
| surfactant of specific example (IV) (p + q = 15) | 0.5 wt. % |
| surfactant of specific example (IV) (R: $C_{10}H_{21}$, K: 7) | 1 wt. % |
| 25% aqueous solution of specific example (I-2) | 1.5 wt. % |
| hydroxyethyl urea | 2 wt. % |
| 2-pyridinethiol-1-oxide sodium | 0.2 wt. % |
| ion exchanged water | balance |

Magenta ink [5] was prepared in the same manner as in Example 1 with the exception of the following composition was used and the pH was adjusted to 7.8 with lithium hydroxide.

| | |
|---|---|
| dye of specific example (M5) | 1.5 wt. % |
| C.I. Acid Red 52 | 0.5 wt. % |
| compound of formula (1), where n = 8 | 1 wt. % |
| magnesium nitrate | 6 wt. % |
| 1,5-pentanediol | 5 wt. % |
| trimethylolpropane | 7 wt. % |
| 2-pyrrolidone | 5 wt. % |
| diethylene glycol monobutyl ether | 2 wt. % |
| surfactant of specific example (IV) (p + q = 15) | 0.5 wt. % |
| surfactant of specific example (V) (R: $C_{10}H_{21}$, K: 7) | 1 wt. % |
| 25% aqueous solution of specific example (I-2) | 1.5 wt. % |
| hydroxyethyl urea | 5 wt. % |
| 2-pyridinethiol-1-oxide sodium | 0.2 wt. % |
| ion exchanged water | balance |

Cyan ink [5] was prepared in the same manner as in Example 1 with the exception of the following composition was used and the pH was adjusted to 8 with lithium hydroxide.

| | |
|---|---|
| dye of specific example (C1) | 1 wt. % |
| dye of specific example (C2) | 2 wt. % |
| Acid Blue 9 | 0.5 wt. % |
| compound of formula (1), where n = 8 | 1 wt. % |
| calcium nitrate | 6 wt. % |
| triethylene glycol | 5 wt. % |
| trimethylolpropane | 7 wt. % |
| 2-pyrrolidone | 5 wt. % |
| diethylene glycol monobutyl ether | 2 wt. % |
| surfactant of specific example (IV) (p + q = 15) | 0.5 wt. % |
| surfactant of specific example (IV) (R: $C_{10}H_{21}$, K: 7) | 1 wt. % |
| 25% aqueous solution of specific example (I-2) | 1.5 wt. % |
| hydroxyethyl urea | 1 wt. % |
| 2-pyridinethiol-1-oxide sodium | 0.2 wt. % |
| ion exchanged water | balance |

Black ink [4] was prepared in the same manner as in Example 1 with the exception of the following composition was used and the pH was adjusted to 8 with lithium hydroxide.

| | |
|---|---|
| dye of specific example (BK1) | 4 wt. % |
| dye of specific example (Y4) | 2 wt. % |
| compound of formula (1), where n = 8 | 1 wt. % |
| calcium nitrate | 6 wt. % |
| triethylene glycol | 5 wt. % |
| trimethylolpropane | 7 wt. % |
| 2-pyrrolidone | 5 wt. % |
| diethylene glycol monobutyl ether | 2 wt. % |
| surfactant of specific example (IV) (p + q = 15) | 0.5 wt. % |
| surfactant of specific example (V) (R: $C_{10}H_{21}$, K: 7) | 1 wt. % |
| 25% aqueous solution of specific example (I-2) | 1.5 wt. % |
| hydroxyethyl urea | 1 wt. % |
| 2-pyridinethiol-1-oxide sodium | 0.2 wt. % |
| ion exchanged water | balance |

Example 9

Yellow ink [6] was prepared in the same manner as in Example 1 with the exception of the following composition was used and the pH was adjusted to 9.5 with lithium hydroxide.

| | |
|---|---|
| dye of specific example (Y4) | 1 wt. % |
| dye of specific example (Y5) | 1 wt. % |
| compound of formula (1), where n = 6 | 1 wt. % |
| magnesium nitrate | 2 wt. % |
| 2-pyrrolidone | 8 wt. % |
| glycerol | 7 wt. % |
| triethylene glycol monobutyl ether | 10 wt. % |
| surfactant of specific example (IV) (p + q = 15) | 0.5 wt. % |
| surfactant of specific example (IV) (p + q = 0) | 0.5 wt. % |
| 25% aqueous solution of specific example (I-7) | 2 wt. % |
| urea | 2 wt. % |
| sodium dehydroacetate | 0.2 wt. % |
| ion exchange water | balance |

Magenta ink [6] was prepared in the same manner as in Example 1 with the exception of the following composition was used and the pH was adjusted to 9.5 with lithium hydroxide.

| | |
|---|---|
| dye of specific example (M1) | 2 wt. % |
| dye of specific example (M2) | 1 wt. % |
| compound of formula (1), where n = 6 | 3 wt. % |
| lanthanum nitrate | 2 wt. % |
| 2-pyrrolidone | 8 wt. % |
| glycerol | 7 wt. % |
| triethylene glycol monobutyl ether | 3 wt. % |
| surfactant of specific example (IV) (p + q = 15) | 0.5 wt. % |
| surfactant of specific example (IV) (p + q = 0) | 0.5 wt. % |

| | |
|---|---|
| 25% aqueous solution of specific example (I-7) | 2 wt. % |
| hydroxyethyl urea | 5 wt. % |
| sodium dehydroacetate | 0.2 wt. % |
| ion exchanged water | balance |

Cyan ink [6] was prepared in the same manner as in Example 1 with the exception of the following composition was used and the pH was adjusted to 9.5 with lithium hydroxide.

| | |
|---|---|
| dye of specific example (C2) | 2 wt. % |
| dye of specific example (C3) | 1 wt. % |
| compound of formula (1), where n = 6 | 3 wt. % |
| lanthanum nitrate | 2 wt. % |
| 2-pyrrolidone | 8 wt. % |
| glycerol | 7 wt. % |
| triethylene glycol monobutyl ether | 3 wt. % |
| surfactant of specific example (IV) (p + q = 15) | 0.5 wt. % |
| surfactant of specific example (IV) (p + q = 0) | 0.5 wt. % |
| 25% aqueous solution of specific example (I-7) | 2 wt. % |
| hydroxyethyl urea | 5 wt. % |
| sodium dehydroacetate | 0.2 wt. % |
| ion exchanged water | balance |

Example 10

Yellow ink [7] was prepared in the same manner as in Example 1 with the exception of the following composition was used and the pH was adjusted to 9.5 with lithium hydroxide.

| | |
|---|---|
| dye of specific example (Y7) | 1 wt. % |
| dye of specific example (Y6) | 0.5 wt. % |
| C. I. Acid Yellow 17 | 1 wt. % |
| compound of formula (1), where n = 6 | 1 wt. % |
| magnesium nitrate | 2 wt. % |
| 2-pyrrolidone | 8 wt. % |
| glycerol | 7 wt. % |
| triethylene glycol monobutyl ether | 10 wt. % |
| surfactant of specific example (IV) (p + q = 15) | 0.5 wt. % |
| surfactant of specific example (IV) (p + q = 0) | 0.5 wt. % |
| 25% aqueous solution of specific example (I-7) | 2 wt. % |
| urea | 2 wt. % |
| sodium dehydroacetate | 0.2 wt. % |
| ion exchange water | balance |

Magenta ink [7] was prepared in the same manner as in Example 1 with the exception of the following composition was used and the pH was adjusted to 9.5 with lithium hydroxide.

| | |
|---|---|
| dye of specific example (M1) | 2 wt. % |
| dye of specific example (M2) | 1 wt. % |
| compound of formula (1), where n = 6 | 3 wt. % |
| lanthanum nitrate | 2 wt. % |
| 2-pyrrolidone | 8 wt. % |
| glycerol | 7 wt. % |
| triethylene glycol monobutyl ether | 3 wt. % |
| surfactant of specific example (IV) (p + q = 15) | 0.5 wt. % |
| surfactant of specific example (IV) (p + q = 0) | 0.5 wt. % |
| 25% aqueous solution of specific example (I-7) | 2 wt. % |
| hydroxyethyl urea | 5 wt. % |
| sodium dehydroacetate | 0.2 wt. % |
| ion exchanged water | balance |

Cyan ink [7] was prepared in the same manner as in Example 1 with the exception of the following composition was used and the pH was adjusted to 9.5 with lithium hydroxide.

| | |
|---|---|
| dye of specific example (C3) | 3 wt. % |
| dye of specific example (C2) | 1 wt. % |
| compound of formula (1), where n = 6 | 2 wt. % |
| calcium nitrate | 1 wt. % |
| 2-pyrrolidone | 8 wt. % |
| glycerol | 7 wt. % |
| 1,3-butanediol | 3 wt. % |
| surfactant of specific example (I-1) | 1 wt. % |
| surfactant of specific example (IV) (p + q = 15) | 0.5 wt. % |
| surfactant of specific example (IV) (p + q = 0) | 0.5 wt. % |
| 25% aqueous solution of specific example (I-7) | 2 wt. % |
| hydroxyethyl urea | 5 wt. % |
| sodium dehydroacetate | 0.2 wt. % |
| ion exchange water | balance |

Comparative Example 1

Black ink [5] was prepared in the same as in Example 1 except that the compound of formula (1), where n=4 was not used.

Comparative Example 2

Black ink [6] was prepared in the same as in Example 2 with the exception of the compound of formula (1) was not used.

Comparative Example 3

Black ink [7] was prepared in the same as in Example 3 with the exception of the compound of formula (1) was replaced by p-toluenesulfonamide.

Comparative Example 4

Yellow ink [8] was prepared in the same as in Example 4 with the exception of the compound of formula (1) in the yellow ink [1] was not used. Magenta ink [8] was prepared in the same as in Example 4 with the exception of the compound of formula (1) in the magenta ink [1] was not used. Cyan ink [8] was prepared in the same as in Example 4 with the exception of the compound of formula (1) in the cyan ink [1] was not used.

Comparative Example 5

Yellow ink [9] was prepared in the same as in Example 5 with the exception of the compound of formula (1) in the yellow ink [2] was not used. Magenta ink [9] was prepared in the same as in Example 5 with the exception of the compound of formula (1) in the magenta ink [2] was not used. Cyan ink [9] was prepared in the same as in Example 5 with the exception of the compound of formula (1) in the cyan ink [2] was not used.

Comparative Example 6

Yellow ink [10] was prepared in the same as in Example 6 with the exception of the compound of formula (1) in the yellow ink [3] was not used. Magenta ink [10] was prepared in the same as in Example 6 with the exception of the compound of formula (1) in the magenta ink [3] was not used. Cyan ink [10] was prepared in the same as in Example 6 with the exception of the compound of formula (1) in the cyan ink [3] was not used.

Comparative Example 7

Yellow ink [11] was prepared in the same as in Example 7 with the exception of the compound of formula (1) in the yellow ink [4] was not used. Magenta ink [11] was prepared in the same as in Example 7 with the exception of the compound of formula (1) in the magenta ink [4] was not used. Cyan ink [11] was prepared in the same as in Example 7 with the exception of the compound of formula (1) in the cyan ink [4] was not used.

Comparative Example 8

Yellow ink [12] was prepared in the same as in Example 8 with the exception of the compound of formula (1) in the yellow ink [5] was not used. Magenta ink [12] was prepared in the same as in Example 8 with the exception of the compound of formula (1) in the magenta ink [5] was not used. Cyan ink [12] was prepared in the same as in Example 8 with the exception of the compound of formula (1) in the cyan ink [5] was not used. Furthermore, black ink [8] was prepared in the same manner as in Example 8 with the exception of the compound of formula (1) and diethylene glycol monobutyl ether in the black ink [4] were not used.

Comparative Example 9

Yellow ink [13] was prepared in the same as in Example 9 with the exception of the compound of formula (1) in the yellow ink [6] was replaced by β-cyclodextrin. Magenta ink [13] was prepared in the same as in Example 9 with the exception of the compound of formula (1) in the magenta ink [6] was replaced by 2-hydroxy-4-methoxy benzophenone. Cyan ink [13] was prepared in the same as in Example 9 with the exception of the compound of formula (1) in the cyan ink [6] was replaced by cyclodextrin polymer.

Comparative Example 10

Yellow ink [14] was prepared in the same as in Example 10 with the exception of the compound of formula (1) in the yellow ink [7] was not used. Magenta ink [14] was prepared in the same as in Example 10 with the exception of the compound of formula (1) in the magenta ink [7] was not used. Cyan ink [14] was prepared in the same as in Example 10 with the exception of the compound of formula (1) in the cyan ink [7] was not used.

Next, tests regarding the following items were conducted with four-color ink sets using Examples 1 to 10 and Comparative Examples 1 to 10.

(1) Clearness of Images

Printing was performed, using an inkjet printer with a thermal inkjet system having 300 nozzles for each color with a nozzle diameter of 18 μm and a 600 dpi pitch, an inkjet printer having 300 nozzles for each color with a diameter of 28 μm and a 200 dpi pitch that employs a laminated PZT for applying pressure to the liquid compartment channel, and an inkjet printer having 300 nozzles for each color that employs an electrostatic actuator for applying pressure to the liquid compartment channel. Then, the bleeding on the boundary portion where two colors are superimposed, the bleeding of images, the tone, and the density were visually observed for integrated evaluation. Furthermore, the color development at OHP projection was evaluated.

The evaluation criteria were as follows. An ink set indicated with A no bleeding on the two color-superimposed boundary portion, and high vividness and color reproduction, regardless of the type of paper, either commercially available regenerated paper, fine paper, glossy film having bond paper and an absorbing layer of water-soluble resin layer, or OHP sheet paper. An ink set indicated with B a low level of bleeding on color boundaries, but non-uniformity in secondary colors in some types of paper. In an ink set indicated with C, bleeding on color boundaries occurs in some types of paper.

(2) Water Resistance of Images

Image samples were immersed in water of 30° C. for one minute, and a change in the image density before and after the process was measured with an X-Rite 938, and the water resistance (fading ratio %) was obtained with the equation:

$$\text{Fading ratio (\%)} = \left[1 - \frac{\text{image density after process}}{\text{image density before process}}\right] \times 100$$

Ink sets having 20% or less in all the types of paper are denoted by A, ink sets having less than 30% are denoted by B, and ink sets having 30% or more are denoted by C.

(3) Light Resistance of Images

Image samples were exposed to light at a black panel temperature of 63° C., a relative humidity of 50% and 0.35 W/m$^2$, with Xenon Weatherometer Ci35w (manufactured by Atlas), using a boron silicate/boron silicate filter. Then, the color fading state after 28 hours was determined based on color difference with an X-Rite 938. Ink sets having ΔE of less than 6 for each color are denoted by A, ink sets having ΔE of 6 or more and less than 15 for each color are denoted by B, and ink sets having ΔE of more than 15 are denoted by C.

(4) Dryness of Image

A paper filter was pressed onto printed images under certain conditions and the time until ink was no longer transferred to the paper filter was measured.

Ink sets whose ink was dried within 10 seconds in all the types of paper are denoted by A, and ink sets that took 10 or more seconds are denoted by C.

(5) Storage Stability

Each ink was placed in a polyethylene container, and stored under the condition of −20° C., 5° C., 20° C., and 70° C. each for three months, and a change in the surface tension, the viscosity, and deposit of a precipitate, and the particle diameter were investigated after the storage. Ink sets exhibiting no change in the properties or the like under any conditions are denoted by A.

(6) Reliability after Printing Pause

Using a printer having a head driven by a PZT having 128-nozzles with a nozzle diameter of 30 μm, it was investigated whether or not the operation of printing can be resumed, regardless of how long the printer is in operation without capping or cleaning during operation and paused. Table 4 shows the results of evaluation of the reliability, based on the time until the jet direction was displaced or the weight of ejected droplets was changed. Ink sets without any particular problems are denoted by A, ink sets that exhibited a small change in the droplet weight and a small level of displacement of ejection are denoted by B, and ink sets that caused significant clogging are denoted by C.

TABLE 4

| | Clearness of images | Light resistibility of images | Waterproofing property of images | Drying Ability of images | Ink storage properties | Ejection reliability |
|---|---|---|---|---|---|---|
| Ink set of Ex. 1 and 4 | A | A | A | A | A | A |
| Ink set of Ex. 2 and 5 | A | A | A | A | A | A |
| Ink set of | A | A | A | A | A | A |

TABLE 4-continued

| | Clearness of images | Light resistibility of images | Waterproofing property of images | Drying Ability of images | Ink storage properties | Ejection reliability |
|---|---|---|---|---|---|---|
| Ex. 3 and 6 | | | | | | |
| Ink set of Ex. 1 and 7 | A | A | A | A | A | A |
| Ink set of Ex. 8 | A | A | B | A | A | A |
| Ink set of Ex. 3 and 9 | A | A | B | A | A | A |
| Ink set of Ex. 3 and 10 | A | A | B | A | A | A |
| Ink set of Com. Ex. 1 and 4 | A | A | A | A | B–C | B |
| Ink set of Com. Ex. 2 and 5 | B | A | A | A | B | B–C |
| Ink set of Com. Ex. 3 and 6 | A | A | A | A | B–C | C |
| Ink set of Com. Ex. 1 and 7 | C | B | B | A | C | B |
| Ink set of Com. Ex. 8 | C | B | B | B | C | C |
| Ink set of Com. Ex. 3 and 9 | B | C | B | A | C | C |
| Ink set of Com. Ex. 3 and 10 | B | B–C | B | A | C | C |

As shall be evident from the detailed and specific descriptions as above, the present invention can provide a recording liquid and inkjet ink that satisfy various characteristics and have excellent color development on plain paper, high image storage properties such as light stability and improved reliability by adding water-soluble calixarene. In addition, the present invention can provide a recording liquid and an inkjet ink having improved properties such as storage properties and ink receptivity in a recording tool or recording equipment by presenting a more preferable form of a compound salt represented by formula (1) that is added for the purpose of improving the above characteristics. Furthermore, the present invention can provide a recording liquid and inkjet ink having high reliability by presenting a more preferable defined mode of the compound of formula (1). Moreover, the present invention can provide a recording liquid and inkjet ink that satisfy various characteristics for recording and have high safety by presenting a more preferable defined mode having more excellent safety of the compound of formula (1). Furthermore, the present invention can provide a recording liquid and inkjet ink that can suppress the bleeding on color boundaries and improve the light stability and water resistance by containing a polyvalent metal ion that forms a phenolate complex of formula (1). The present invention can provide a recording liquid and inkjet ink that can suppress the bleeding on color boundaries and improve the light stability and water resistance without affecting the tone of images by defining a compound that is a source of the polyvalent metal ion. Furthermore, the present invention can provide a recording liquid and inkjet ink having improved light stability and preferable color reproducibility especially on plain paper by using a dye in combination with the compound of formula (1), and provide a recording liquid and inkjet ink having improved light stability and balanced tone and water resistance especially on plain paper by using the compound of formula (1) and a dye to which sulfonic acid and carboxylic acid groups are introduced. Furthermore, the present invention can provide inkjet pigment ink having high water resistance and light resistance on plain paper, high reliability and improved bleeding on color boundaries, compared to conventional ink, by using the compound of formula (1) and a pigment. In addition, the present invention can provide a recording liquid and inkjet pigment ink having excellent reliability in the printing system by using the compound of formula (1) and a pigment having a particle size in a specific range. Furthermore, the present invention can provide a recording liquid and inkjet pigment ink having good fixity and high reliability by using the compound of formula (1) and a pigment dispersed with a dispersant containing one or more of carboxyl group. Furthermore, the present invention can provide a recording liquid and inkjet pigment ink having high ejection stability even after a long time pause by using the compound of formula (1) and a pigment whose surface is improved. Furthermore, the present invention can provide a recording liquid and inkjet pigment ink having high ejection stability, especially excellent water resistance and bleeding on color boundaries by using the compound of formula (1) and a pigment containing one or more carboxyl group as hydrophilic group on the surface of the pigment. Furthermore, the present invention can provide a recording liquid and inkjet ink that can provide images having improved color reproducibility and gloss quality on plain paper and high light stability by using the compound of formula (1) and particles colored with a dye or a pigment. Furthermore, the present invention can provide a recording liquid and inkjet ink with colored particles that excellent reliability in the printing system and hardly degrade images by using the compound of formula (1) and particles having a particle size in a specific range. Moreover, the present invention can provide a recording liquid and inkjet ink having good re-ejection properties after a long time pause by disclosing a water-soluble organic solvent added for the property range providing moisture retaining properties and ejection stability in combination with the compound of formula (1). In addition, the present invention can provide a recording liquid and inkjet ink having improved wettability to a recording medium and high reliability by adding a specific surfactant in combination with the compound of formula (1). Furthermore, the present invention can provide a recording liquid and inkjet ink having improved wettability to a recording medium and high reliability by adding a specific solvent-based penetrating agent in combination with the compound of formula (1). Furthermore, the property range that provides good compatibility with members of the printing system and good storage stability can be obtained by containing the compound of formula (1) and adjusting the pH in a specific range.

The present invention can provide a recording method that can form good images on plain paper by forming images with the ink under specific conditions. The present invention can provide an ink cartridge that can form good images by filling an ink cartridge having a specific configuration with the ink to form images. The present invention can provide an inkjet apparatus that can form good images by using the ink in form of droplets by thermal energy or mechanical energy to form images. Thus, the present invention the excellent effects described above.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

Japanese Patent Application No. 2000-370598 filed Dec. 5, 2000, is hereby incorporated by reference.

What is claimed is:

1. A recording liquid comprising a coloring material, an organic solvent to disperse or to dissolve said coloring material, and water, wherein the recording liquid further comprises a compound represented by following formula (1) in form of free acid or a salt thereof:

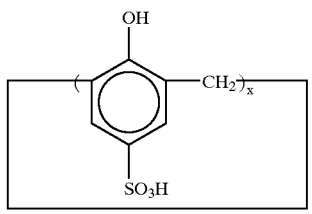

where x is 4 to 8.

2. A recording liquid according to claim 1, wherein the salt is a salt selected from the group consisting of an alkali metal salt, a quaternary ammonium salt, an alkanolamine salt, and a quaternary phosphonium salt.

3. A recording liquid according to claim 1, wherein the salt is lithium salt.

4. A recording liquid according to claim 1, wherein the salt is a quaternary ammonium salt having at least one hydroxyl group.

5. A recording liquid according to claim 1, wherein the salt is an alkanolamine salt selected from the group consisting of ethanol amine salt, diethanol amine salt, and triethanol amine salt.

6. A recording liquid according to claim 1, wherein the recording liquid comprises a polyvalent metal ion source compound with a releasable polyvalent metal ion, and the polyvalent metal ion is rendered to a phenolate complex thereof with a compound represented by above mentioned formula (1), at an alkaline state.

7. A recording liquid according to claim 6, wherein the polyvalent metal ion source compound is at least one polyvalent metal ion source compound selected from the group consisting of an alkaline-earth metal salt, a lanthanoid metal salt, an aluminum salt and a zinc salt, those salts having a solubility more than or equal to 1 g/100 g in water.

8. A recording liquid according to claim 1, wherein the coloring material is a dye.

9. A recording liquid according to claim 1, wherein the coloring material is a dye having at least one sulfonic acid group and/or carboxylic acid group.

10. A recording liquid according to claim 1, wherein the coloring material is a pigment.

11. A recording liquid according to claim 1, wherein the coloring material is pigment particles having average size 10 nm to 300 nm.

12. A recording liquid according to claim 1, wherein the coloring material is a pigment being dispersed in water by a dispersant, the dispersant having a carboxyl group or groups bonded thereto.

13. A recording liquid according to claim 1, wherein the coloring material is a pigment having been improved at surface thereof and being bonded by a hydrophilic group or groups, and the pigment being dispersed in the water.

14. A recording liquid according to claim 1, wherein the coloring material is a pigment having been improved at surface thereof and being bonded by a carboxyl group or groups, and the pigment being dispersed in water.

15. A recording liquid according to claim 1, wherein the coloring material is particles, the particles being colored by a dye or a pigment.

16. A recording liquid according to claim 1, wherein the coloring material is particles having an average size 10 nm to 300 nm, the particles being colored by a dye or a pigment.

17. A recording liquid according to claim 1, wherein the organic solvent is at least a water-soluble or -mixable organic solvent selected from the group consisting of glycerin, ethylene glycol, diethylene glycol, triethylene glycol, propylene glycol, dipropylene glycol, tripropylene glycol, 1,3-butanediol, 2,3-butanediol, 1,4-butanediol, 1,5-pentanediol, tetraethylene glycol, 1,6-hexanediol, 2-methyl-2-, 4-pentanediol, polyethylene glycol, 1,2,4-butanetriol, 1,2,6-hexanetriol, thiodiglycol, 2-pyrrolidone, N-methyl-2-pyrrolidone, N-hydroxyethyl -2-pyrrolidone, and 1,3-dimethyl-2-imidazolidinone.

18. A recording liquid according to claim 1, wherein the recording liquid contains at least one surfactant selected from the group consisting of a salt of poly-oxyethylene alkyl ether acetate, a salt of dialkyl sulfosuccinate, a poly-oxyethylene alkyl ether, a poly-oxyethylene alkyl phenyl ether, a polyoxyethylene-polyoxypropylene block copolymer and an acetylenic glycol-based surfactant.

19. A recording liquid according to claim 1, wherein the recording liquid contains a polyhydric alcohol alkyl ether and/or a diol, the diol having 6 or more carbon atoms.

20. A recording liquid according to claim 1, wherein the pH of the recording liquid is adjusted to a pH value of 6 to 11.

21. A recording process comprising steps of forming small droplets of an ink as a recording liquid according to claim 1 to eject by actuating thermal energy or mechanical energy, and depositing the ejected droplets onto surface of a member to be recorded having a sized degree of 3 seconds or more by Stoeckigt Sizing Degree determination conducted by the test method of JIS P-8122, wherein resolution degree of the record is more than or equal to 10 dots/mm×10 dots/mm of fineness, and amount of ink attached on the member to be recorded is 1.5 g/m² to 30 g/m².

22. A recording liquid cartridge comprising a recording liquid reservoir containing a recording liquid, wherein the recording liquid is a recording liquid according to claim 1.

23. An inkjet recording apparatus comprising a recording liquid reservoir or a recording liquid cartridge containing a recording liquid therein, a recording head or a recording unit for forming droplets of the recording liquid to eject the droplets by actuation of thermal energy or mechanical energy, wherein the recording liquid is a recording liquid according to claim 1.

* * * * *